(12) United States Patent
Kitahara et al.

(10) Patent No.: US 9,449,806 B2
(45) Date of Patent: Sep. 20, 2016

(54) HIGH-VOLTAGE DISCHARGE LAMP, LAMP UNIT, PROJECTION IMAGE DISPLAY DEVICE, AND METHOD FOR MANUFACTURING HIGH-VOLTAGE DISCHARGE LAMP

(75) Inventors: Yoshiki Kitahara, Osaka (JP); Katsuhiro Ono, Osaka (JP); Jun Sakaguchi, Osaka (JP); Mitsuko Shuto, Osaka (JP); Yutaka Nishida, Kyoto (JP)

(73) Assignee: PANASONIC INTELLECTUAL PROPERTY MANAGEMENT CO., LTD. (JP)

( * ) Notice: Subject to any disclaimer, the term of this patent is extended or adjusted under 35 U.S.C. 154(b) by 1060 days.

(21) Appl. No.: 13/321,502

(22) PCT Filed: Jun. 4, 2010

(86) PCT No.: PCT/JP2010/003737
§ 371 (c)(1),
(2), (4) Date: Nov. 18, 2011

(87) PCT Pub. No.: WO2010/140379
PCT Pub. Date: Dec. 9, 2010

(65) Prior Publication Data
US 2012/0069307 A1    Mar. 22, 2012

(30) Foreign Application Priority Data

Jun. 4, 2009 (JP) ................. 2009-134858
Nov. 12, 2009 (JP) ................. 2009-258603

(51) Int. Cl.
*H01J 61/36* (2006.01)
*G03B 21/20* (2006.01)
*H01J 61/86* (2006.01)

(52) U.S. Cl.
CPC ......... *H01J 61/368* (2013.01); *G03B 21/2026* (2013.01); *H01J 61/86* (2013.01)

(58) Field of Classification Search
CPC .................................. H01J 61/36; H01J 61/02
USPC ..................................... 313/113, 623; 353/98
See application file for complete search history.

(56) References Cited

U.S. PATENT DOCUMENTS 4,053,351 A * 10/1977 DeForest et al. ............... 216/47
5,936,350 A    8/1999 Yoshida et al.
(Continued)

FOREIGN PATENT DOCUMENTS

| CN | 1218273 | 6/1999 |
|---|---|---|
| CN | 1259553 | 7/2000 |

(Continued)

OTHER PUBLICATIONS

Chinese Application No. 201080024482.4 Office Action dated Feb. 8, 2014, 12 pages with partial English translation.

(Continued)

*Primary Examiner* — William C Dowling
*Assistant Examiner* — Jerry Brooks

(57) ABSTRACT

Disclosed is a high-pressure discharge lamp (100) that reduces the occurrence of cracks even under high mercury vapor pressure. The high-pressure discharge lamp (100) is provided with a glass arc tube (102) including a light-emitting part (103) and a sealing part (104) connected to the light-emitting part (103), the light-emitting part (103) enclosing a discharge space, and a pair of electrodes (101), one end of each of the electrodes (101) facing one end of the other electrode (101) in the discharge space, and another end of each electrode (101) being embedded in the sealing part (104) and connected to a metal foil (105), at least one embedded section of the pair of electrodes (101) including at least one projection (101c).

10 Claims, 24 Drawing Sheets

(56) References Cited

U.S. PATENT DOCUMENTS

| | | | |
|---|---|---|---|
| 6,232,719 B1 | 5/2001 | Kaneko et al. | |
| 6,354,900 B1 * | 3/2002 | Ohshima et al. | 445/26 |
| 6,426,592 B2 * | 7/2002 | Nishida et al. | 313/623 |
| 7,489,081 B2 * | 2/2009 | Haselhorst | H01J 9/28 |
| | | | 313/623 |
| 2002/0190654 A1 | 12/2002 | Kanzaki et al. | |
| 2003/0048078 A1 | 3/2003 | Fukuyo et al. | |
| 2003/0094899 A1 * | 5/2003 | Fukushima et al. | 313/574 |
| 2007/0182331 A1 | 8/2007 | Haselhorst et al. | |
| 2007/0296339 A1 | 12/2007 | Grundmann et al. | |
| 2009/0040478 A1 * | 2/2009 | Yamauchi et al. | 353/98 |

FOREIGN PATENT DOCUMENTS

| | | | |
|---|---|---|---|
| CN | 1950919 | 4/2007 | |
| CN | 101065825 | 10/2007 | |
| CN | 101082683 | 12/2007 | |
| EP | 0 858 098 | 8/1998 | |
| EP | 8 858 098 | 8/1998 | |
| JP | 10-223175 | 8/1998 | |
| JP | 2003-086136 | 3/2003 | |
| JP | 2003-123695 | 4/2003 | |
| JP | 3480453 | 10/2003 | |
| JP | 2006-040840 | 2/2006 | |
| JP | 2007-531230 | 11/2007 | |
| JP | 2008-522372 | 6/2008 | |
| JP | 2008-181844 | 8/2008 | |
| WO | WO 2008/032247 | * 3/2008 | H01J 61/073 |

OTHER PUBLICATIONS

Chinese Application No. 201080024482.4 Office Action dated Sep. 3, 2014, 2014, 13 pages with partial English translation.

PCT/JP2010/003737 International Search Report dated Aug. 17, 2010, 8 pages with English translation.

* cited by examiner

FIG. 19A
FIG. 19B
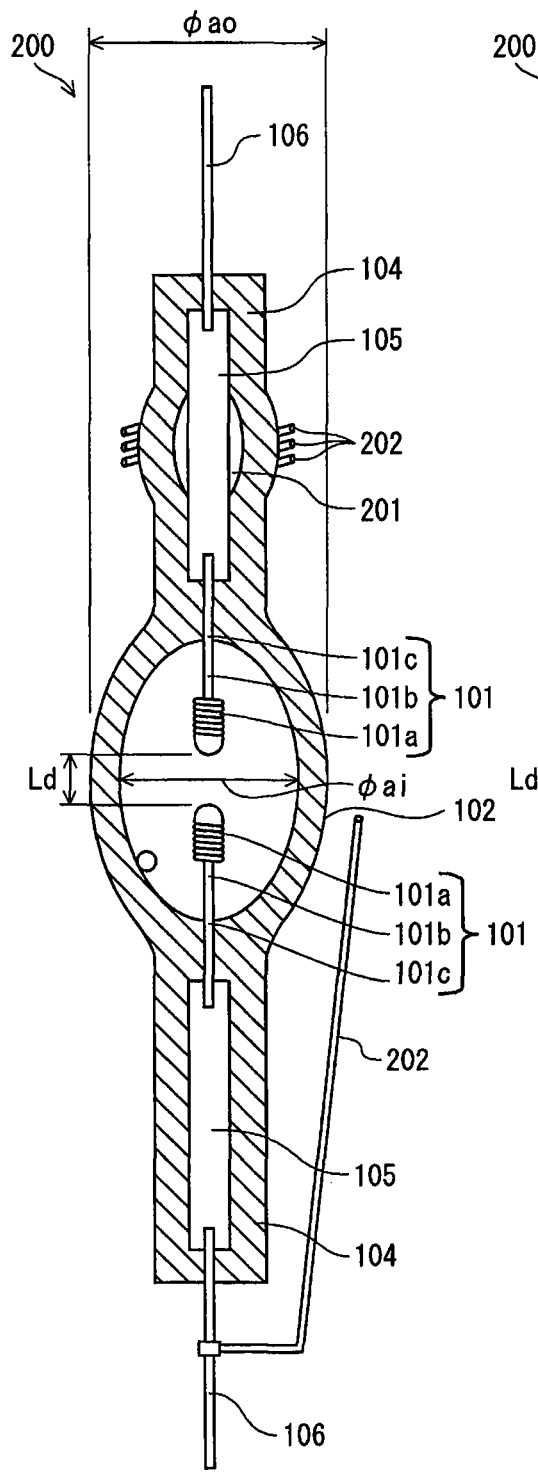
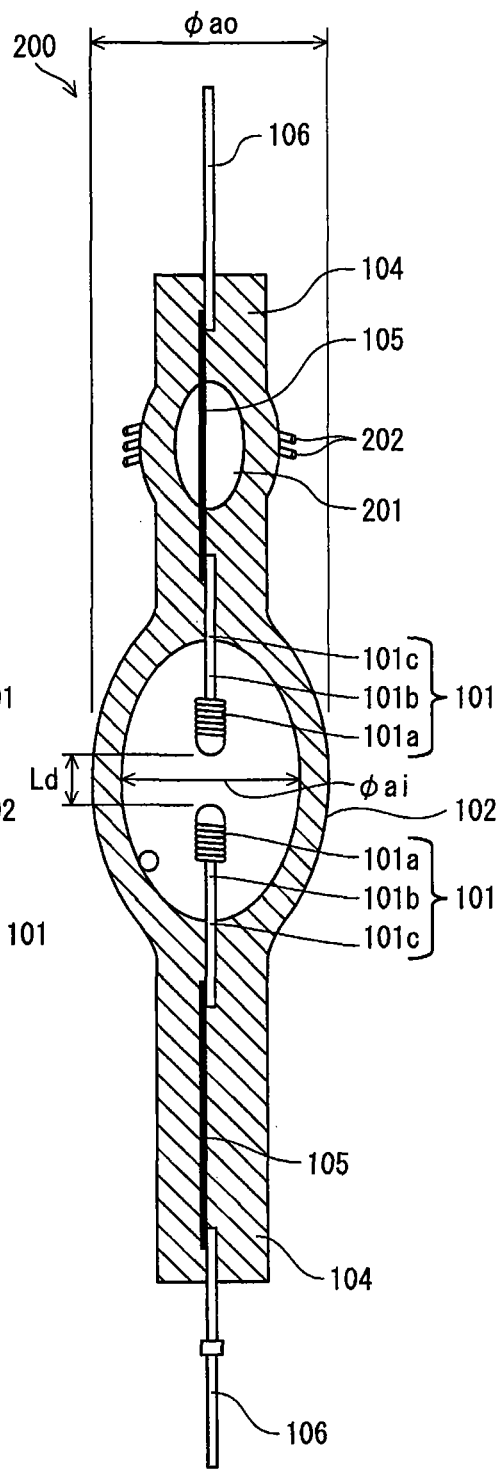

FIG. 22

| Conditions | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| Metallic particles | Molybdenum | ✓ | ✓ | ✓ | – | – | – | – | – | – | ✓ | ✓ | ✓ | – | – | – | – | – | – | ✓ | ✓ | ✓ | – | – | – | – | – | – |
| | Tungsten | – | – | – | ✓ | ✓ | ✓ | – | – | – | – | – | – | ✓ | ✓ | ✓ | – | – | – | – | – | – | ✓ | ✓ | ✓ | – | – | – |
| | Rhenium | – | – | – | – | – | – | ✓ | ✓ | ✓ | – | – | – | – | – | – | ✓ | ✓ | ✓ | – | – | – | – | – | – | ✓ | ✓ | ✓ |
| Acidic solution | Aqueous hydrogen peroxide | ✓ | ✓ | ✓ | ✓ | ✓ | ✓ | ✓ | ✓ | ✓ | – | – | – | – | – | – | – | – | – | – | – | – | – | – | – | – | – | – |
| | Nitric acid | – | – | – | – | – | – | – | – | – | ✓ | ✓ | ✓ | ✓ | ✓ | ✓ | ✓ | ✓ | ✓ | – | – | – | – | – | – | – | – | – |
| | Hydrofluoric and nitric acid | – | – | – | – | – | – | – | – | – | – | – | – | – | – | – | – | – | – | – | – | – | – | – | – | – | – | – |
| | Hydrofluoric acid | – | – | – | – | – | – | – | – | – | – | – | – | – | – | – | – | – | – | – | – | – | – | – | – | – | – | – |
| | Aqua regia | – | – | – | – | – | – | – | – | – | – | – | – | – | – | – | – | – | – | – | – | – | – | – | – | – | – | – |
| | Ethanol | – | – | – | – | – | – | – | – | – | – | – | – | – | – | – | – | – | – | – | – | – | – | – | – | – | – | – |
| Coated location | (1) Surface of electrode bar | ✓ | – | – | ✓ | – | – | ✓ | – | – | ✓ | – | – | ✓ | – | – | ✓ | – | – | ✓ | – | – | ✓ | – | – | ✓ | – | – |
| | (2) Portions of electrode bar welded to metal foil | – | ✓ | – | – | ✓ | – | – | ✓ | – | – | ✓ | – | – | ✓ | – | – | ✓ | – | – | ✓ | – | – | ✓ | – | – | ✓ | – |
| | (3) Back of metal foil | – | – | ✓ | – | – | ✓ | – | – | ✓ | – | – | ✓ | – | – | ✓ | – | – | ✓ | – | – | ✓ | – | – | ✓ | – | – | ✓ |
| Occurrence of cracks | Initial cracks | O | O | O | O | O | O | O | O | O | O | O | O | O | O | O | O | O | O | O | O | O | O | O | O | O | O | O |
| | 100 hours | O | O | O | O | O | O | O | O | O | O | O | O | O | O | O | O | O | O | O | O | O | O | O | O | O | O | O |
| | 250 hours | O | O | O | O | O | O | O | O | O | O | O | O | O | O | O | O | O | O | O | O | O | O | O | O | O | O | O |
| | 500 hours | O | O | O | O | O | O | O | O | O | O | O | O | O | O | O | O | O | O | O | O | O | O | O | O | O | O | O |
| | 750 hours | O | O | O | O | O | O | O | O | O | O | O | O | O | O | O | O | O | O | O | O | O | O | O | O | O | O | O |
| | 1000 hours | O | O | O | O | O | O | O | O | O | O | O | O | O | O | O | O | O | O | O | O | O | O | O | O | O | O | O |
| | 1500 hours | O | O | O | O | O | O | O | O | O | O | O | O | O | O | O | O | O | O | O | O | O | O | O | O | O | O | O |
| | 2000 hours | O | O | O | O | O | O | O | O | O | O | O | O | O | O | O | O | O | O | O | O | O | O | O | O | O | O | O |

Experiments

FIG. 23

| Conditions | | Experiments | | | | | | | | | | | | | | | | | | | | | | | | | | |
|---|---|---|---|---|---|---|---|---|---|---|---|---|---|---|---|---|---|---|---|---|---|---|---|---|---|---|---|
| | | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
| Metallic particles | Molybdenum | ✓ | ✓ | ✓ | – | – | – | – | – | – | ✓ | ✓ | ✓ | – | – | – | – | – | – | – | – | – | – | – | – | – | – | – |
| | Tungsten | – | – | – | ✓ | ✓ | ✓ | – | – | – | – | – | – | ✓ | ✓ | ✓ | – | – | – | – | – | – | – | – | – | – | – | – |
| | Rhenium | – | – | – | – | – | – | ✓ | ✓ | ✓ | – | – | – | – | – | – | ✓ | ✓ | ✓ | – | – | – | – | – | – | – | – | – |
| Acidic solution | Aqueous hydrogen peroxide | – | – | – | – | – | – | – | – | – | – | – | – | – | – | – | – | – | – | ✓ | ✓ | ✓ | – | – | – | – | – | – |
| | Nitric acid | – | – | – | – | – | – | – | – | – | – | – | – | – | – | – | – | – | – | – | – | – | ✓ | ✓ | ✓ | – | – | – |
| | Hydrofluoric and nitric acid | – | – | – | – | – | – | – | – | – | – | – | – | – | – | – | – | – | – | – | – | – | – | – | – | ✓ | ✓ | ✓ |
| | Hydrofluoric acid | ✓ | ✓ | ✓ | ✓ | ✓ | ✓ | ✓ | ✓ | ✓ | – | – | – | – | – | – | – | – | – | – | – | – | – | – | – | – | – | – |
| | Aqua regia | – | – | – | – | – | – | – | – | – | ✓ | ✓ | ✓ | ✓ | ✓ | ✓ | ✓ | ✓ | ✓ | – | – | – | – | – | – | – | – | – |
| | Ethanol | – | – | – | – | – | – | – | – | – | – | – | – | – | – | – | – | – | – | – | – | – | – | – | – | – | – | – |
| Coated location | (1) Surface of electrode bar | ✓ | – | – | ✓ | – | – | ✓ | – | – | ✓ | – | – | ✓ | – | – | ✓ | – | – | ✓ | – | – | ✓ | – | – | ✓ | – | – |
| | (2) Portions of electrode bar welded to metal foil | – | ✓ | – | – | ✓ | – | – | ✓ | – | – | ✓ | – | – | ✓ | – | – | ✓ | – | – | ✓ | – | – | ✓ | – | – | ✓ | – |
| | (3) Back of metal foil | – | – | ✓ | – | – | ✓ | – | – | ✓ | – | – | ✓ | – | – | ✓ | – | – | ✓ | – | – | ✓ | – | – | ✓ | – | – | ✓ |
| Occurrence of cracks | Initial cracks | O | O | O | O | O | O | O | O | O | O | O | O | O | O | O | O | O | O | × | × | × | × | × | × | × | × | × |
| | 100 hours | O | O | O | O | O | O | O | O | O | O | O | O | O | O | O | O | O | O | × | × | × | × | × | × | × | × | × |
| | 250 hours | O | O | O | O | O | O | O | O | O | O | O | O | O | O | O | O | O | O | × | × | × | × | × | × | × | × | × |
| | 500 hours | O | O | O | O | O | O | O | O | O | O | O | O | O | O | O | O | O | O | × | × | × | × | × | × | × | × | × |
| | 750 hours | O | O | O | O | O | O | O | O | O | O | O | O | O | O | O | O | O | O | × | × | × | × | × | × | × | × | × |
| | 1000 hours | O | O | O | O | O | O | O | O | O | O | O | O | O | O | O | O | O | O | × | × | × | × | × | × | × | × | × |
| | 1500 hours | O | O | O | O | O | O | O | O | O | O | O | O | O | O | O | O | O | O | × | × | × | × | × | × | × | × | × |
| | 2000 hours | O | O | O | O | O | O | O | O | O | O | O | O | O | O | O | O | O | O | × | × | × | × | × | × | × | × | × |

HIGH-VOLTAGE DISCHARGE LAMP, LAMP UNIT, PROJECTION IMAGE DISPLAY DEVICE, AND METHOD FOR MANUFACTURING HIGH-VOLTAGE DISCHARGE LAMP

TECHNICAL FIELD

The present invention relates to a high-pressure discharge lamp, a lamp unit, a projection image display device, and a method for manufacturing high-pressure discharge lamps.

BACKGROUND ART

In recent years, short-arc high-pressure discharge lamps, in which mercury vapor pressure is for example at least 20 MPa, have been attracting attention as a light source for projection image display devices such as liquid crystal projectors. This is because such high-pressure discharge lamps provide nearly point-source light. Furthermore, due to high mercury vapor pressure during lighting, such lamps are expected to achieve high-intensity light with high color rendering.

Short-arc high-pressure discharge lamps have a structure that includes a glass arc tube and a pair of electrodes. The arc tube includes a light-emitting part, which is provided with a discharge space therein, and sealing parts connected to the light-emitting part. The electrodes are each embedded in the corresponding sealing part so that one end thereof faces the other electrode in the discharge space, while the other end is connected to a metal foil (see, for example, Patent Literature 1). Note that the high-pressure discharge lamp may simply be referred to as a "lamp".

CITATION LIST

Patent Literature

Patent Literature 1: Japanese Patent No. 3480453

SUMMARY OF INVENTION

Technical Problem

Recently, as the intensity and efficiency of lamps increase, a demand has arisen for the development of super-high-pressure discharge lamps in which the mercury vapor pressure during lighting exceeds 300 atmospheres (approximately 30 MPa). Proposals are being sought for lamps that have higher pressure resistance and are less likely to crack. With conventional technology, however, while it is possible to reduce the occurrence of cracks in a high-pressure discharge lamp having, for example, 0.20 mg/mm$^3$ of mercury enclosed in the light-emitting part as a light-emitting material, experimental manufacturing of high-pressure discharge lamps having 0.25 mg/mm$^3$-0.38 mg/mm$^3$ of mercury enclosed therein revealed that the sealing parts were damaged during an early stage of cumulative lighting of such lamps, for example during aging in the manufacturing process. Therefore, there is a strong demand for development of high-pressure discharge lamps that can reduce the occurrence of cracks even under conditions of high mercury vapor pressure.

In light of the above problems, it is a first object of the present invention to provide a high-pressure discharge lamp, and a method of manufacturing the same, that reduces the occurrence of cracks even under conditions of high mercury vapor pressure. It is a second object of the present invention to provide a lamp unit, and a projection image display device incorporating the lamp unit, that achieve high image display performance through use of the high-pressure discharge lamp.

Solution to Problem

In order to solve the above problems, a high-pressure discharge lamp according to an aspect of the present invention comprises a glass arc tube including a light-emitting part and a sealing part connected to the light-emitting part, the light-emitting part enclosing a discharge space; and a pair of electrodes, one end of each of the electrodes facing one end of the other electrode in the discharge space, and another end of each electrode being embedded in the sealing part and connected to a metal foil, wherein at least one embedded section of the pair of electrodes has at least one projection.

In order to solve the above problems, a high-pressure discharge lamp according to another aspect of the present invention comprises a glass arc tube including a light-emitting part and a sealing part connected to the light-emitting part, the light-emitting part enclosing a discharge space; a pair of electrodes, one end of each of the electrodes facing one end of the other electrode in the discharge space; and a metal foil embedded in the sealing part with the other end of each electrode connected thereto, wherein the metal foil includes at least one projection.

A lamp unit according to an aspect of the present invention comprises the high-pressure discharge lamp; and a reflector having a concave reflecting surface, the high-pressure discharge lamp being attached to an inside of the reflector so that light emitted from the high-pressure discharge lamp is reflected by the reflecting surface.

A projection image display device according to an aspect of the present invention comprises the lamp unit; an optical unit that converts illumination from the lamp unit and forms an optical image; and a projection device that enlarges and projects the optical image.

A method of manufacturing a high-pressure discharge lamp according to an aspect of the present invention comprises the steps of (a) preparing a glass including a light-emitting part and a sealing part connected to the light-emitting part, the light-emitting part enclosing a discharge space; (b) preparing an electrode provided with a main body and a rod-shaped part having high melting-point metallic particles interspersed on a surface thereof, the metallic particles having been treated with an acidic solution; (c) inserting the rod-shaped part into the sealing part so that the main body protrudes into the light-emitting part; and (d) sealing the rod-shaped part by fusing and then pressure welding the sealing part.

Advantageous Effects of Invention

A high-pressure discharge lamp according to an aspect of the present invention reduces the occurrence of cracks along the boundary surface between the electrode and the sealing part of the arc tube even under extremely high mercury vapor pressure, such as when mercury vapor pressure while the lamp is lit exceeds 300 atmospheres. As a result, even if the lamp is lit under conditions of high mercury vapor pressure, damage to the arc tube due to cracks is reduced, thereby achieving a high-pressure discharge lamp with higher reliability and a long lifetime. There is a large difference between the coefficients of thermal expansion of the metal forming the electrodes and the quartz glass forming the sealing parts, leading to strain in the quartz glass of the sealing parts when, for example, the quartz glass is melted to seal the electrodes. The risk of cracks occurring at the boundary surface between the electrodes and the sealing parts is therefore high. Since at least one projection is formed on the embedded section of the pair of electrodes in the high-pressure discharge lamp according to an aspect of the present invention, strain on the sealing parts is reduced, as is the occurrence of cracks.

In the high-pressure discharge lamp according to an aspect of the present invention, the at least one projection is preferably formed on at least one of regions at either end of the at least one embedded section of the pair of electrodes along a central electrode axis. Examination by the inventors indicated that within the sealing parts of the arc tube, cracks particularly tend to occur at either end of the embedded section of each electrode along a central electrode axis. This is considered to be because strain easily occurs in these parts, since these parts experience large thermal contraction and expansion during processing and when the lamp is turned on or off, and since these parts reach approximately 1000° C. due to transfer of heat from the arc when the lamp is lit, therefore easily undergoing thermal expansion. The occurrence of cracks is effective reduced by forming a projection on such a part that easily undergoes strain.

In the high-pressure discharge lamp according to an aspect of the present invention, the at least one projection preferably comprises a plurality of interspersed projections. With this structure, stress is dispersed, thus further reducing the occurrence of strain.

In the high-pressure discharge lamp according to an aspect of the present invention, the height of the at least one projection is preferably greater than a maximum height $R_{max}$ of surface roughness of the embedded sections of the pair of electrodes in locations other than the at least one projection. With such a structure, the projection takes precedence over locations along the surface of the electrode other than the projection in coming into contact with the glass of the sealing part, thereby further reducing the occurrence of strain.

In the high-pressure discharge lamp according to an aspect of the present invention, the height of the at least one projection is preferably at least 10 μm and at most 100 μm. With this structure, the projection takes further precedence over locations along the surface of the electrode other than the projection in coming into contact with the glass of the sealing part, thereby further reducing the occurrence of strain.

In the high-pressure discharge lamp according to an aspect of the present invention, the at least one projection preferably differs in crystalline structure from the embedded sections of the pair of electrodes in locations other than the at least one projection. Such a projection with a different crystalline structure can be formed by irradiating the surface of the electrode with a laser.

In the high-pressure discharge lamp according to an aspect of the present invention, the at least one projection is preferably substantially conical in shape. With this structure, stress focuses easily on the tip of the projection, improving the effect of dispersing stress on the sealing part and further reducing the occurrence of strain.

In the high-pressure discharge lamp according to an aspect of the present invention, the at least one projection preferably comprises high melting-point metallic particles treated in an acidic solution. After repeated and careful examination, the inventors arrived at the present invention by focusing on the behavior of the electrodes and the sealing parts at the boundary surface therebetween during thermal expansion and contraction. High melting-point metallic particles treated with an acidic solution and interspersed along the boundary surface between the electrodes and the sealing parts acted as a buffer, reducing the stress caused by the difference in the amount of expansion or contraction between the electrodes and the sealing part, thus resulting in a reduction of the occurrence of cracks.

In the high-pressure discharge lamp according to an aspect of the present invention, the high melting-point metallic particles are preferably metallic particles of one or more selected from the group consisting of molybdenum, tungsten, and rhenium. These metallic particles are easily acquirable commercially with 3N purity (99.9%) or higher.

In the high-pressure discharge lamp according to an aspect of the present invention, the acidic solution preferably includes one or more selected from the group consisting of aqueous hydrogen peroxide, hydrofluoric acid, nitric acid, and aqua regia. This is because these acidic solutions have a strong effect of dissolving molybdenum, tungsten, and rhenium.

In the high-pressure discharge lamp according to an aspect of the present invention, a thin quartz glass tube is preferably fit on each of the embedded sections of the electrodes, an inner wall of each thin glass tube being coated with the high melting-point metallic particles. This structure is preferable for reducing the occurrence of cracks in the boundary surface region between the electrodes and the sealing parts.

A high-pressure discharge lamp according to an aspect of the present invention reduces the occurrence of cracks along the boundary surface between the metal foils and the sealing parts of the arc tube even under extremely high mercury vapor pressure, such as when mercury vapor pressure while the lamp is lit exceeds 300 atmospheres, since at least one projection is formed on the metal foils. As a result, even if the lamp is lit under conditions of high mercury vapor pressure, damage to the arc tube due to cracks is reduced, thereby achieving a high-pressure discharge lamp with higher reliability and a long lifetime. There is a large difference between the coefficients of thermal expansion of the metal forming the metal foils and the quartz glass forming the sealing parts, leading to strain in the quartz glass of the sealing parts when, for example, the quartz glass is melted to seal the metal foils. The risk of cracks occurring at the boundary surface between the metal foils and the sealing parts is therefore high. Since at least one projection is formed on the metal foils in the high-pressure discharge lamp according to an aspect of the present invention, strain on the sealing parts is reduced, as is the occurrence of cracks.

Since a lamp unit according to an aspect of the present invention is provided with the above high-pressure discharge lamp that reduces the occurrence of strain and cracks in the sealing parts, the lamp unit has a high image-display capability and is highly reliable.

Since a projection image display device according to an aspect of the present invention is provided with the above high-pressure discharge lamp that reduces the occurrence of strain and cracks in the sealing parts, the projection image display device has a high image-display capability and is highly reliable.

The method of manufacturing a high-pressure discharge lamp according to the present invention includes the step of preparing an electrode provided with a main body and a rod-shaped part having high melting-point metallic particles interspersed on a surface thereof, the metallic particles being treated with an acidic solution, thereby allowing for the manufacturing of a high-pressure discharge lamp that reduces the occurrence of strain and cracks in the sealing parts.

BRIEF DESCRIPTION OF DRAWINGS

FIG. 19A is a front cross-section diagram of a high-pressure discharge lamp according to Embodiment 2 of the present invention, and FIG. 19B is a left cross-section diagram of the high-pressure discharge lamp.

FIG. 22 shows results for Embodiment 3 of the present invention.

FIG. 23 shows results for Embodiment 3 of the present invention.

DESCRIPTION OF EMBODIMENTS

Figure 1:
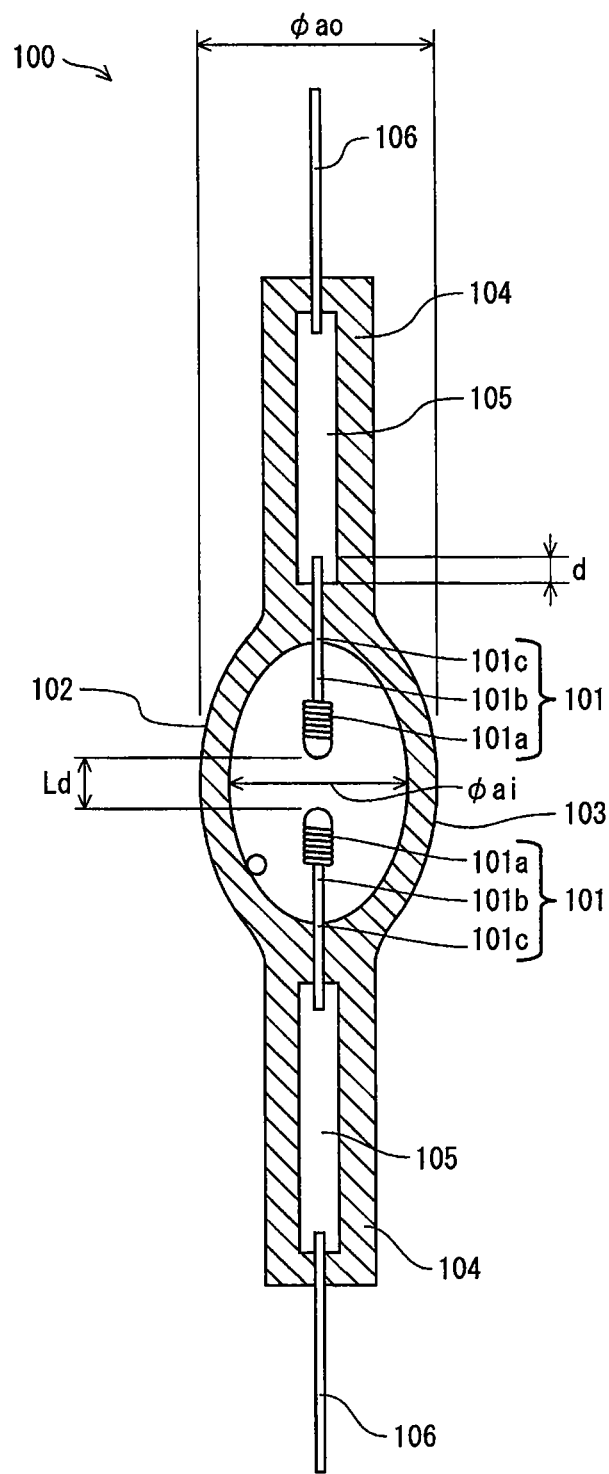
FIG. 1 is a cross-section diagram of a high-pressure discharge lamp according to Embodiment 1 of the present invention, including a central axis thereof in the direction of length.

The following describes the best embodiments of the present invention with reference to the drawings. When describing the present invention, the character "-" in numerical ranges indicates that the values on either side are included in the range. Furthermore, in the drawings, the scale of compositional elements and the distances therebetween differs from actual scale.

Embodiment 1

Figure 2:
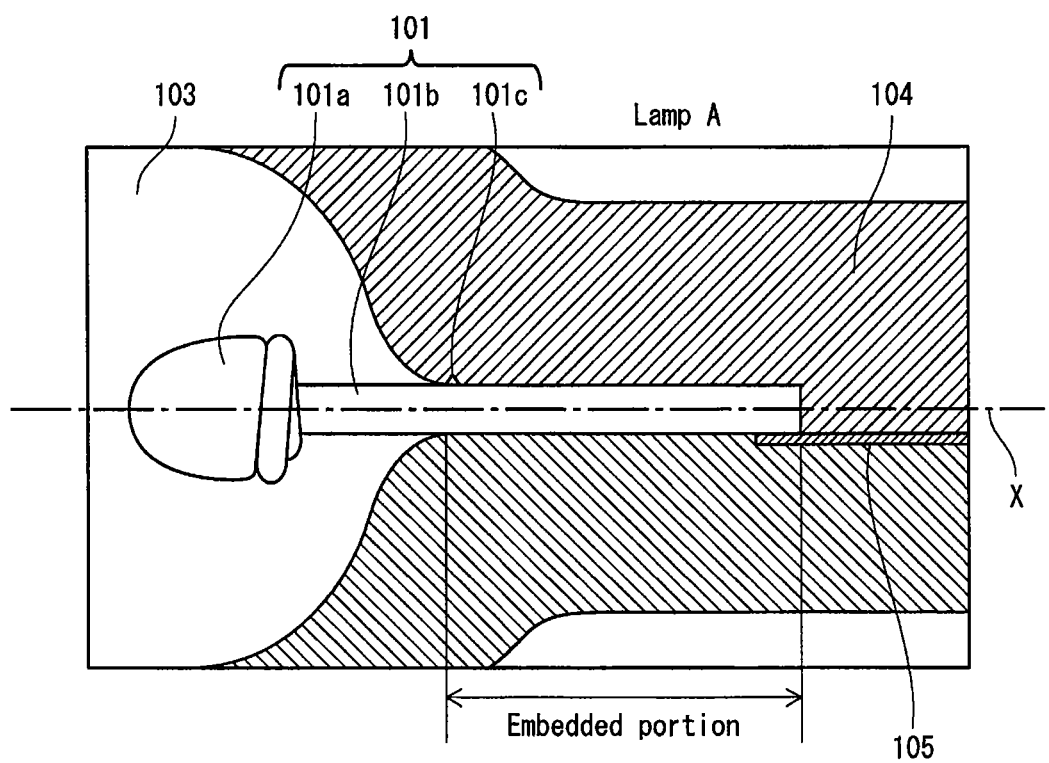
FIG. 2 is an enlarged cross-section diagram of the principal parts of the high-pressure discharge lamp, including a central axis thereof in the direction of length.

FIG. 1 shows the structure of a high-pressure discharge lamp according to Embodiment 1 of the present invention, and FIG. 2 shows an enlarged cross-section diagram of the principal parts thereof. In the high-pressure discharge lamp according to Embodiment 1 of the present invention (hereinafter referred to as "high-pressure discharge lamp 100"), rated power is, for example, 300 W, and the high-pressure discharge lamp is provided with a glass arc tube 102 in which electrodes 101 are disposed. The arc tube 102 includes a light-emitting part 103 and sealing parts 104 connected to the light-emitting part 103. The light-emitting part 103 encloses a substance as well as a discharge space. Note that for the sake of convenience in the drawings, the electrodes 101 in FIGS. 1 and 2, and the metal foils 105 and lead wires 106 in FIG. 1, which are described below, are shown without being cut away as a cross-section.

The light-emitting part 103 is a part where the discharge space is formed, is spherical or elliptical in shape, and is made of quartz glass, which is a translucent material. The shape of the light-emitting part 103 may, for example, be approximately spherical, with an outer diameter of approximately 12 mm and an inner diameter of approximately 5 mm, and enclose a discharge space having an internal volume of approximately 0.1 cm$^3$. Note that the outer and inner diameters of the light-emitting part 103, the internal volume of the discharge space, and the like are not particularly limited and can be freely designed in accordance with the specifications of the high-pressure discharge lamp 100.

Inside the light-emitting part 103 are enclosed a predetermined amount of each of the following: mercury (Hg), a light-emitting material; a noble gas for aiding activation, such as argon (Ar); and a halogen material, such as bromine (Br).

By enclosing approximately 0.3 mg/mm$^3$ of mercury as a light-emitting material, approximately 30 kPa of a noble gas for aiding activation, and approximately $10^{-7}$ μmol/mm$^3$-$10^{-2}$ μmol/mm$^3$ of bromine as a halogen material in the light-emitting part 103 which has a capacity of approximately 0.1 cm$^3$, the mercury vapor pressure during lamp lighting becomes approximately 300 atmospheres.

The noble gas may, for example, be any of argon (Ar), krypton (Kr), or xenon (Xe), or a mixed gas of two or more of these. The halogen material can be iodine (I), bromine (Br), or chlorine (Cl), or a mixed material of two or more of these. Furthermore, the mercury vapor pressure during lamp lighting is not limited to 300 atmospheres, but can be freely adjusted by changing the amount of mercury enclosed in the light-emitting part 103, for example.

Each sealing part 104 is an approximately columnar member formed by pressure bonding quartz glass in a molten state and seals the light-emitting part 103 to be airtight. The method of forming the sealing part 104 is not particularly limited and may, for example, be a well-known shrink-seal method or the like. The outer diameter, length, shape, and the like of the sealing part 104 are not particularly limited and can be changed in accordance with specifications of the high-pressure discharge lamp 100.

A pair of the electrodes 101, which are made for example from tungsten, are disposed to face each other in the light-emitting part 103. The electrodes 101 each have a main body 101a and a rod-shaped part 101b connected to the main body 101a. Each electrode 101 is sealed by the corresponding sealing part 104, with an edge of each electrode 101 by the main body 101a positioned in the discharge space, and the opposite edge by the rod-shaped part 101b connected to the metal foil 105 described below. The connection is made by welding, for example. The part of each electrode 101 embedded in the sealing part 104 is referred to as the embedded section of the electrode 101 (see FIG. 3).

The rod-shaped part 101b is a metal component formed from tungsten or the like, and a cross-section thereof is an approximate cylinder with an approximately circular shape. From the perspective of achieving high intensity, in the case of a short-arc high-pressure discharge lamp, the distance Ld between the pair of electrodes 101 is preferably adjusted within a range from 0.5 mm or greater to 2.0 mm or less in order to approach point-source light (see FIG. 1).

The main body 101a is formed for example by wrapping a tungsten coil around an edge of the rod-shaped part 101b.

Note that the main body 101a and the rod-shaped part 101b are not limited to a coil structure and a tungsten metal rod. For example, a tungsten metal rod can be cut so that the radius of the main body 101a is larger than the radius of the rod-shaped part 101b. Alternatively, the tip of the rod-shaped part 101b may protrude from the tip of the main body 101a.

In each sealing part 104, the edge of the rod-shaped part 101b opposite the main body 101a is connected, for example along a circumferential surface thereof, to an edge of the metal foil 105. The metal foil 105 is a metal component made from molybdenum or the like and is rectangular, for example. The metal foil 105 is embedded in the sealing part 104 with the edge by the light-emitting part 103 overlapping the edge of the rod-shaped part 101b and the other edge connected to an edge of the lead wire 106. This structure is preferable, since by the metal foil 105 being embedded in the sealing part 104 while connected to the rod-shaped part 101b, the discharge space becomes more airtight. Note that the location where the rod-shaped part 101b and the metal foil 105 are connected is not particularly limited. It is preferable to adjust the length of the welded part, i.e. the minimum distance d from the edge of the metal foil 105 by the electrode 101 to the edge of the rod-shaped part 101b by the metal foil 105, to be within a range from 1.0 mm or greater to 1.5 mm or less. The connection between the rod-shaped part 101b and the metal foil 105 can be formed by laser welding, resistance welding, or the like.

As shown in FIG. 2, at least one projection 101c is formed on the surface of the rod-shaped part 101b at an edge thereof closer to the sealing part 104 by the light-emitting part 103, or at an edge thereof closer to the metal foil 105.

Figure 3:
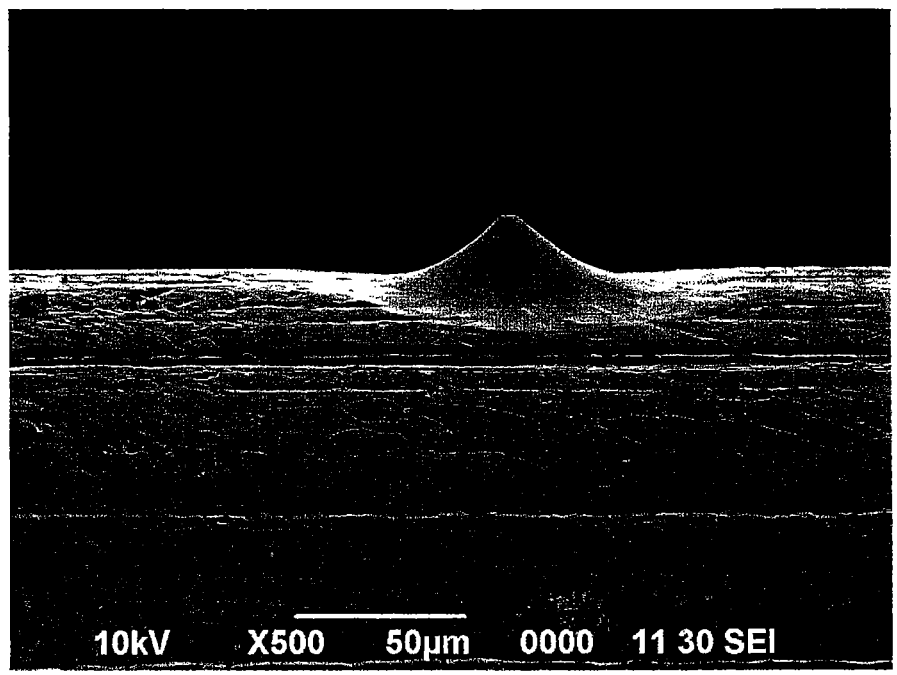
FIG. 3 is an electron micrograph, at 500 times magnification, of a rod-shaped part in the high-pressure discharge lamp.

FIG. 3 shows an electron micrograph, at 500 times magnification, of the rod-shaped part 101b. As shown in FIG. 3, the projection 101c projects from the circumferential surface of the rod-shaped part 101b in an approximately vertical direction with respect to the central axis X of the electrode. This projection 101c reduces strain on the sealing part 104, thus reducing the occurrence of cracks.

Examples of specific values for the high-pressure discharge lamp in this embodiment are as follows.

Inner diameter φai of the light-emitting part at a central region thereof: 5 mm
    Outer diameter φao: 12 mm
    Internal volume of light-emitting part: 0.1 cm$^3$
    Inter-electrode distance Ld: 1.2 mm
    Amount of enclosed mercury: 0.35 mg/mm$^3$
    Amount of enclosed argon gas: 30 kPa (25° C.)
    Amount of enclosed bromine: $0.5 \times 10^{-3}$ μmol Experiments In order to confirm that the high-pressure discharge lamp 100 reduces the occurrence of strain on the sealing parts 104 and reduces the occurrence of cracks, the inventors performed experiments to check for strain and cracks in the sealing parts 104.

Figure 4:
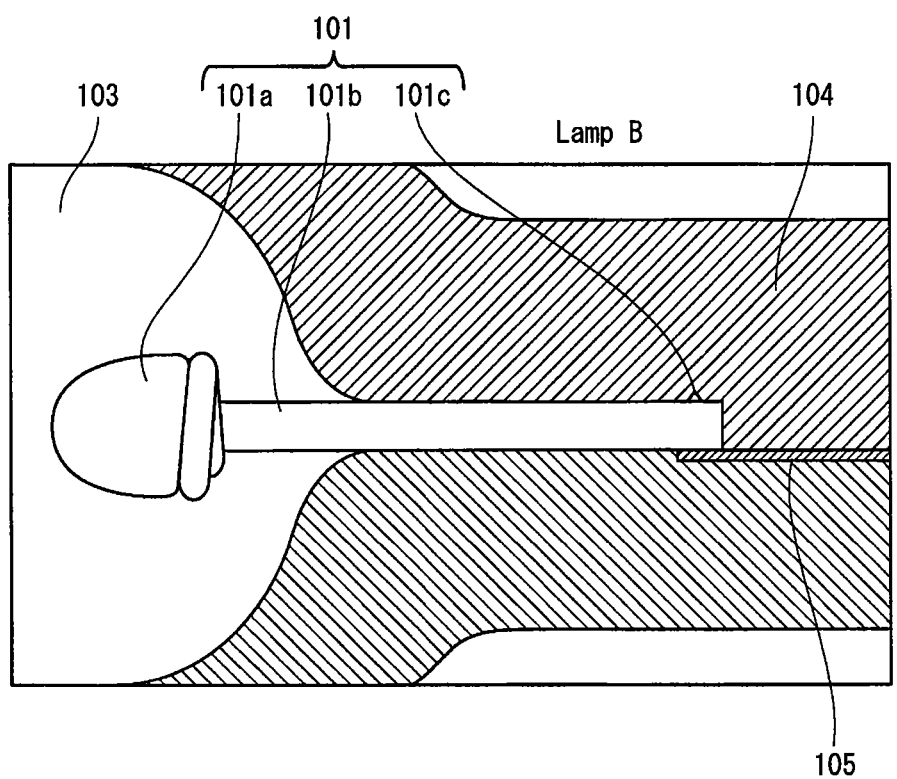
FIG. 4 is an enlarged cross-section diagram of the principal parts of modification 1 of the high-pressure discharge lamp, including a central axis thereof in the direction of length.
Figure 5:
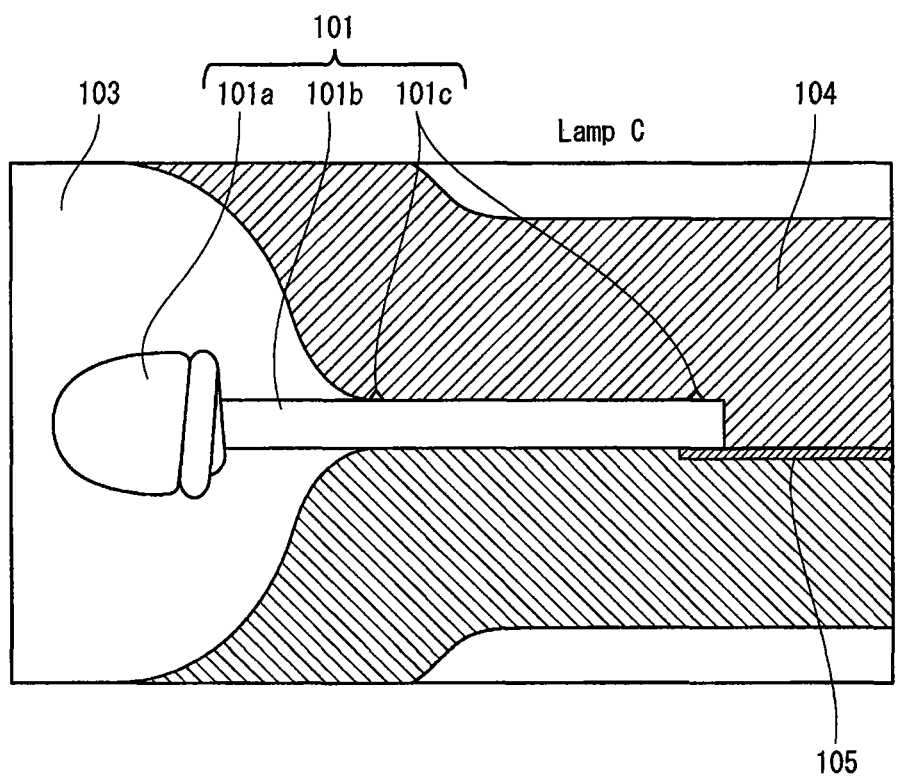
FIG. 5 is an enlarged cross-section diagram of the principal parts of modification 2 of the high-pressure discharge lamp, including a central axis thereof in the direction of length.
Figure 6:
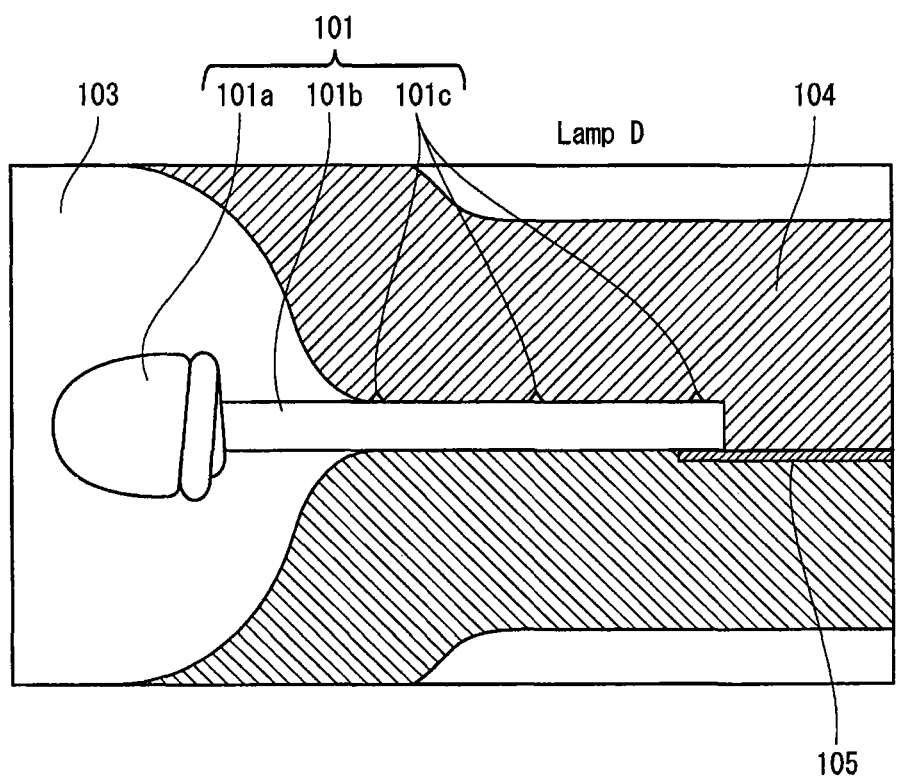
FIG. 6 is an enlarged cross-section diagram of the principal parts of modification 3 of the high-pressure discharge lamp, including a central axis thereof in the direction of length.
Figure 7:
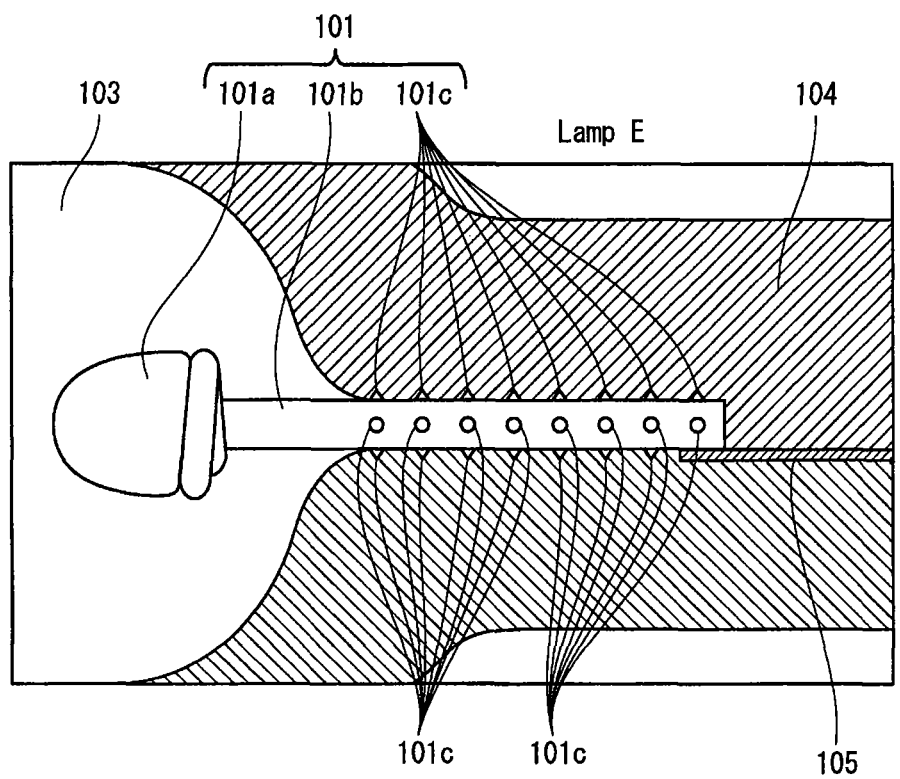
FIG. 7 is an enlarged cross-section diagram of the principal parts of modification 4 of the high-pressure discharge lamp, including a central axis thereof in the direction of length.
Figure 8:
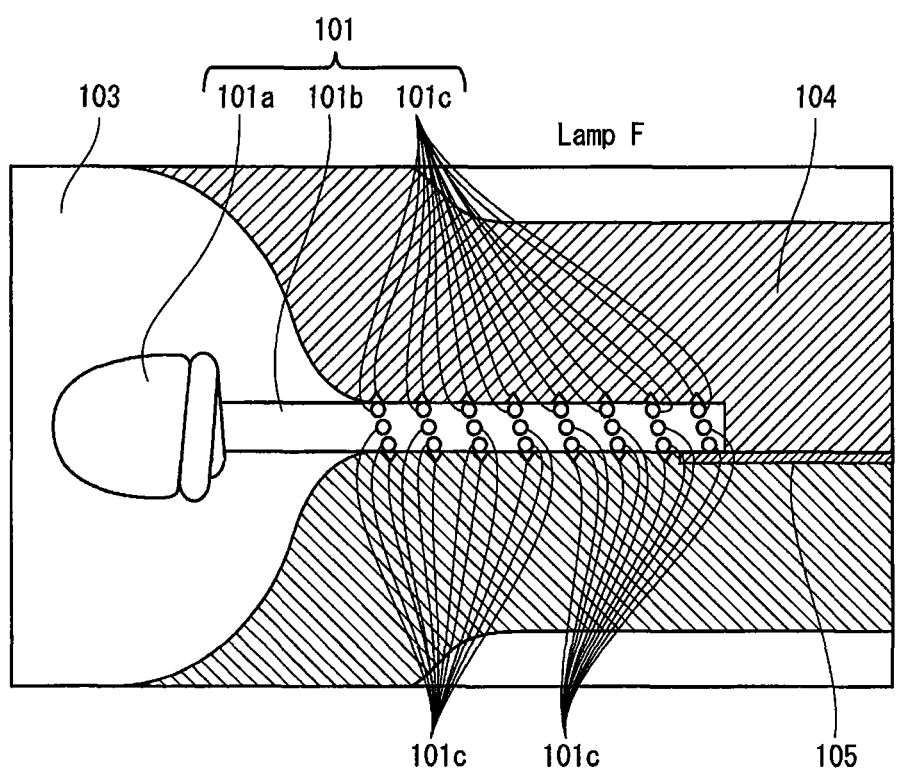
FIG. 8 is an enlarged cross-section diagram of the principal parts of modification 5 of the high-pressure discharge lamp, including a central axis thereof in the direction of length.

First, a lamp having substantially the same structure as the high-pressure discharge lamp 100, and having one projection 101c formed on the surface of the rod-shaped part 101b at an edge thereof closer to the sealing part 104 by the light-emitting part 103, was designated as lamp A. As shown in FIG. 4, a lamp having substantially the same structure as lamp A, except for the one projection 101c being formed on the surface of the rod-shaped part 101b at an edge thereof closer to the metal foil 105, was designated as lamp B. As shown in FIG. 5, another lamp having substantially the same structure as lamp A, except for having another projection 101c formed on the surface of the rod-shaped part 101b at an edge thereof closer to the metal foil 105, was designated as lamp C. As shown in FIG. 6, a lamp having substantially the same structure as lamp C, except for having another projection 101c formed on the surface of the rod-shaped part 101b between an edge thereof closer to the sealing part 104 by the light-emitting part 103 and an edge thereof closer to the metal foil 105, was designated as lamp D. Additionally, as shown in FIG. 7, another lamp having substantially the same structure as lamp A, except for having projections 101c formed in circular patterns on the surface of the rod-shaped part 101b from an edge thereof closer to the sealing part 104 by the light-emitting part 103 to an edge thereof closer to the metal foil 105, was designated as lamp E. Furthermore, as shown in FIG. 8, another lamp having substantially the same structure as lamp A, except for having projections 101c formed in a spiral pattern on the surface of the rod-shaped part 101b from an edge thereof closer to the sealing part 104 by the light-emitting part 103 to an edge thereof closer to the metal foil 105, was designated as lamp F. For comparison, a lamp having substantially the same structure as lamp A, except for not having any projections 101c formed along the surface of the rod-shaped part 101b, was designated as lamp G. Note that for the sake of convenience, the electrode 101 in FIGS. 4-8 is shown without being cut away as a cross-section.

During the experiments, the presence of cracks in the sealing parts was determined visually before lamp lighting, after aging, upon 100 h of lighting after aging, upon 250 h of lighting after aging, upon 500 h of lighting after aging, and upon 1000 h of lighting after aging. Three of each lamp were created as test samples. If cracks that affect performance of the sealing parts occurred in at least one sample, that type of lamp was assessed as "x". If cracks that affect performance of the sealing parts did not occur in any of the three samples, that type of lamp was assessed as "o". Table 1 shows the results of the experiments.

TABLE 1

| Test samples | Examples | | | | | | Comparative example lamp G |
|---|---|---|---|---|---|---|---|
| | lamp A | lamp B | lamp C | lamp D | lamp E | lamp F | |
| Initial stage | o | o | o | o | o | o | x |
| Aging | o | o | o | o | o | o | x |
| 100 h | o | o | o | o | o | o | — |
| 250 h | o | o | o | o | o | o | — |
| 500 h | o | o | o | o | o | o | — |
| 1000 h | o | o | o | o | o | o | — |

As shown in table 1, at the initial stage before lamp lighting, after aging, and after 100 h-1000 h of lighting, cracks that affect performance of the sealing parts did not occur in any of the lamps A-F, i.e. the examples. On the other hand, in lamp G, the comparative example, cracks already occurred at the initial stage in one of the samples, and after aging, cracks had occurred in the sealing parts of all three samples. Note that for lamp G, since cracks had occurred in the sealing parts in all three samples after aging, observations were not made from 100 h of lighting onwards.

Figure 9:
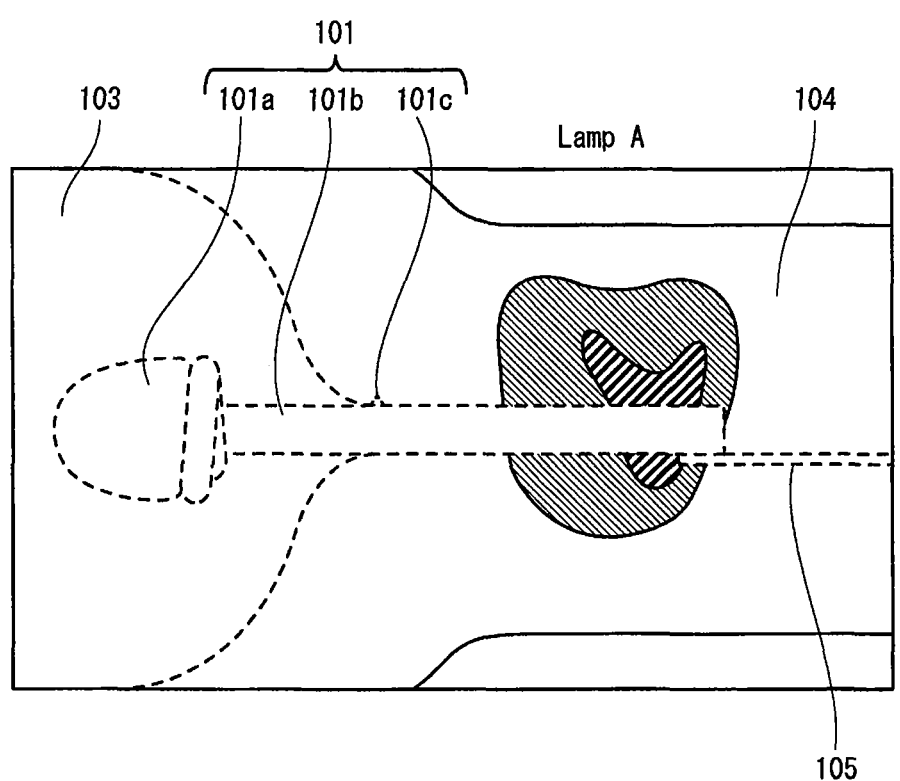
FIG. 9 is an enlarged cross-section diagram of the principal parts of lamp A, showing strain therein.
Figure 10:
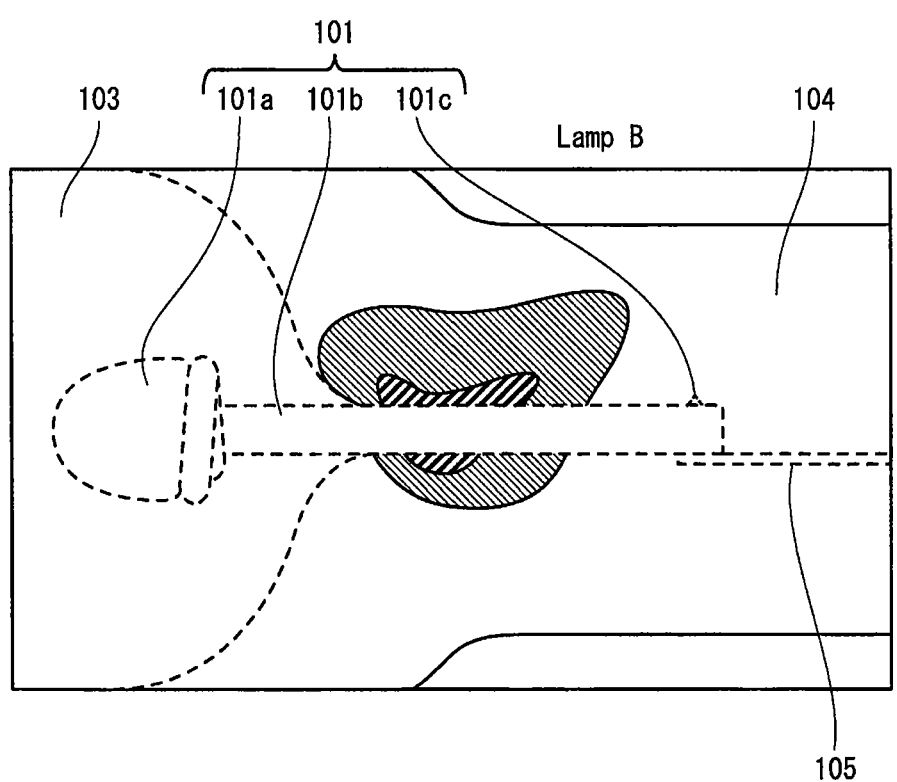
FIG. 10 is an enlarged cross-section diagram of the principal parts of lamp B, showing strain therein.
Figure 11:
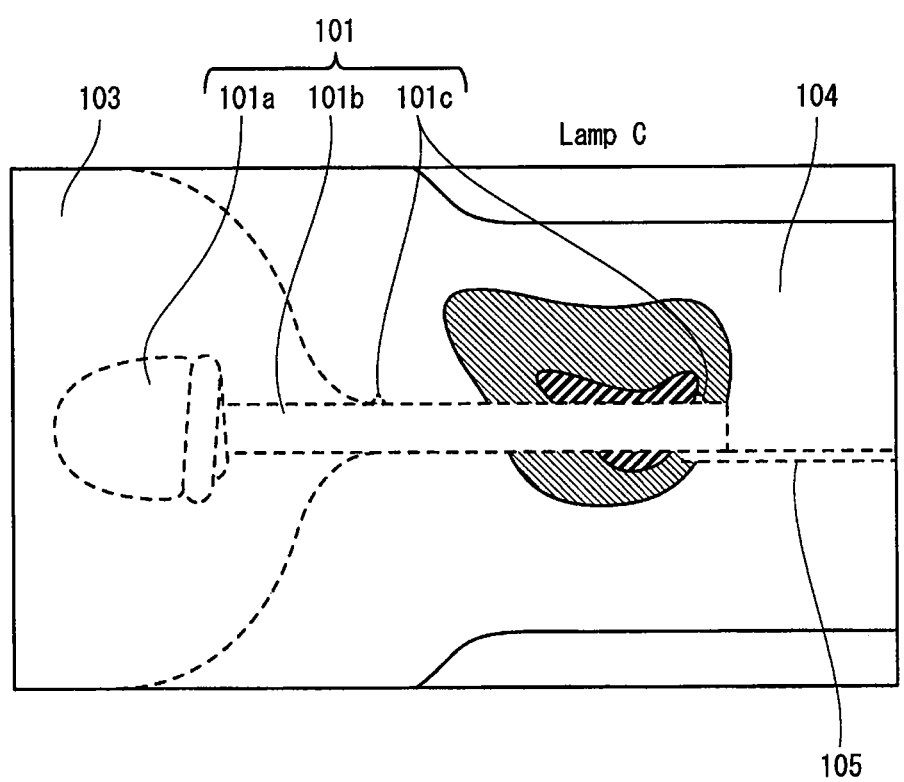
FIG. 11 is an enlarged cross-section diagram of the principal parts of lamp C, showing strain therein.
Figure 12:
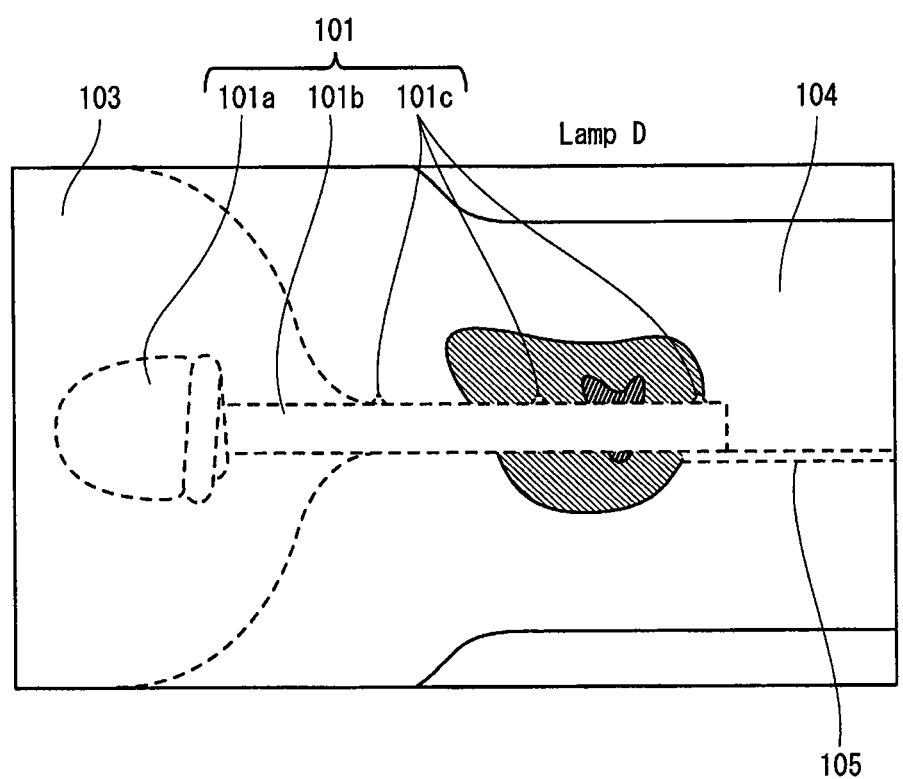
FIG. 12 is an enlarged cross-section diagram of the principal parts of lamp D, showing strain therein.
Figure 13:
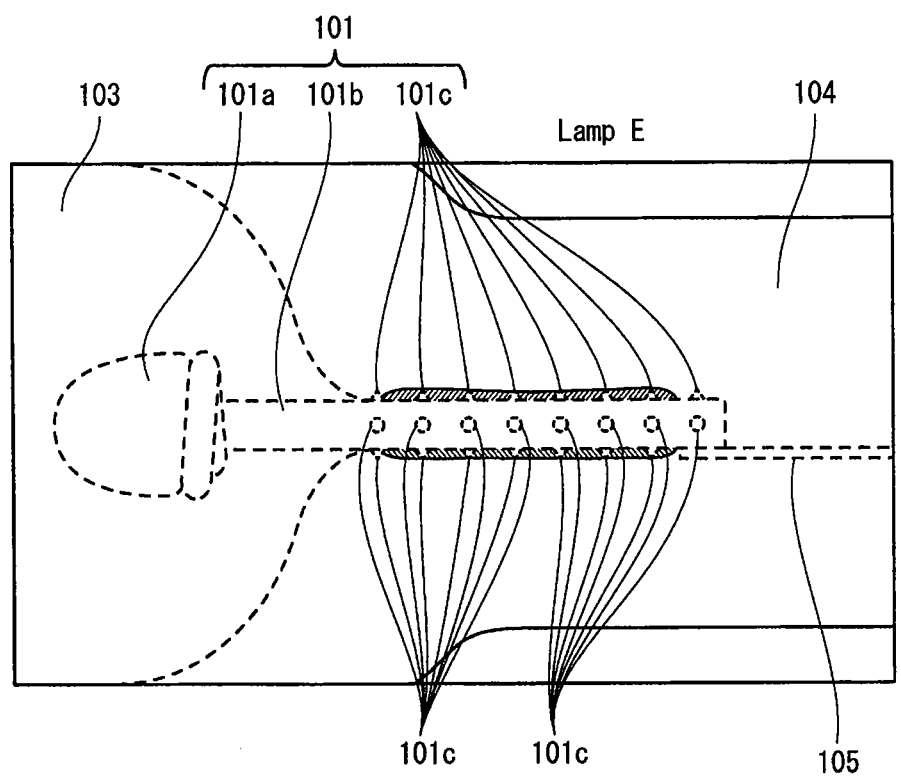
FIG. 13 is an enlarged cross-section diagram of the principal parts of lamp E, showing strain therein.
Figure 14:
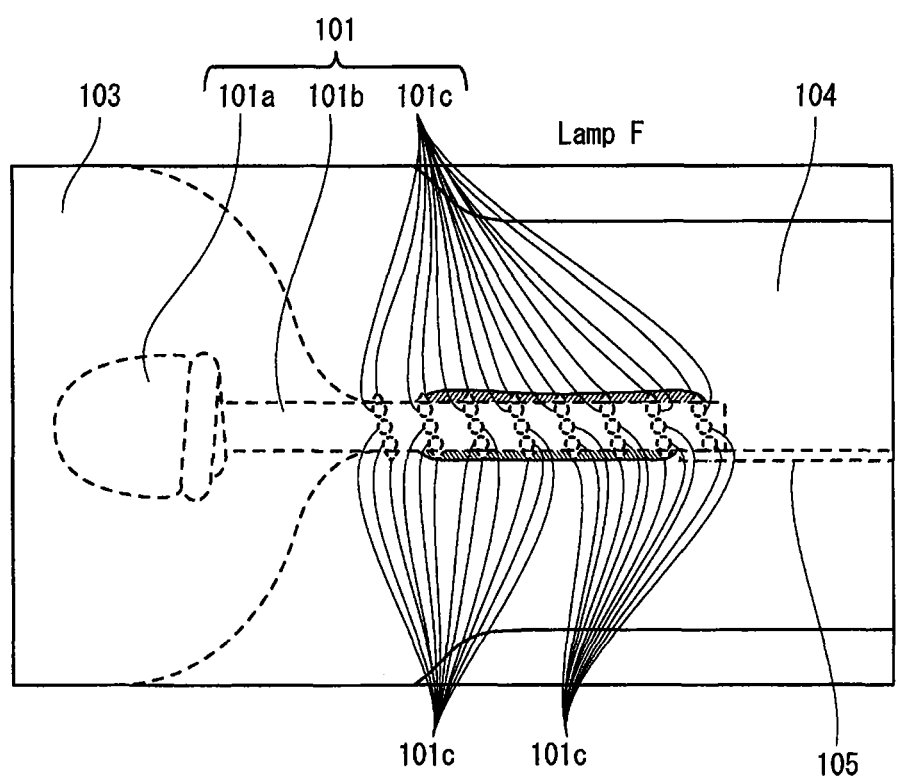
FIG. 14 is an enlarged cross-section diagram of the principal parts of lamp F, showing strain therein.
Figure 15:
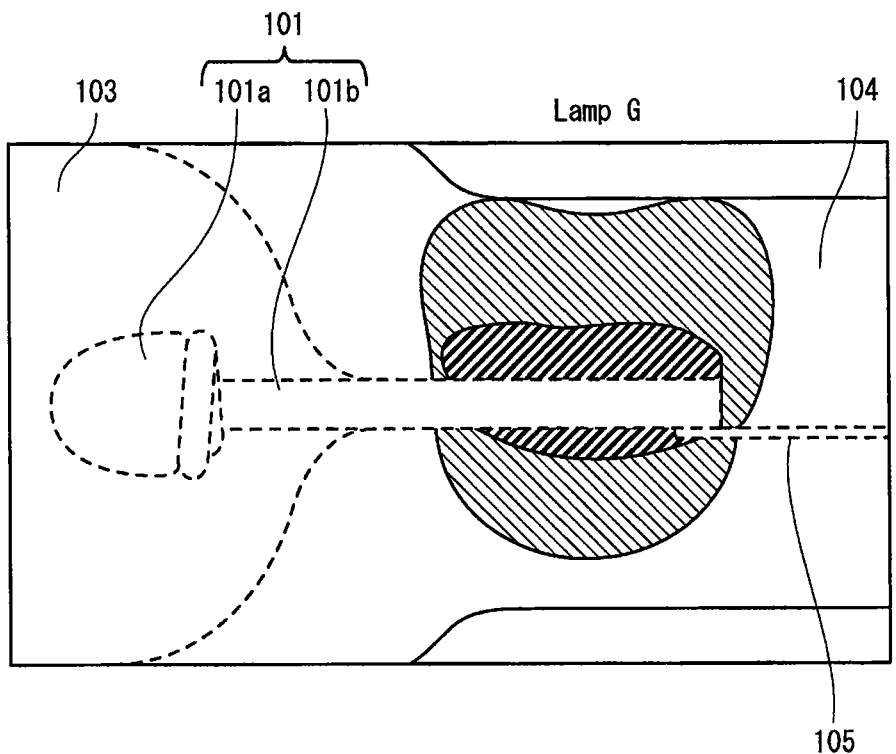
FIG. 15 is an enlarged cross-section diagram of the principal parts of lamp G, showing strain therein.

Furthermore, the inventors measured the strain on the sealing parts at the initial stage before lamp lighting for each test sample. FIG. 9 is an enlarged cross-section diagram of the principal parts of lamp A, showing strain therein, FIG. 10 is an enlarged cross-section diagram of the principal parts of lamp B, showing strain therein, FIG. 11 is an enlarged cross-section diagram of the principal parts of lamp C, showing strain therein, FIG. 12 is an enlarged cross-section diagram of the principal parts of lamp D, showing strain therein, FIG. 13 is an enlarged cross-section diagram of the principal parts of lamp E, showing strain therein, FIG. 14 is an enlarged cross-section diagram of the principal parts of lamp F, showing strain therein, and FIG. 15 is an enlarged cross-section diagram of the principal parts of lamp G, showing strain therein. Note that in FIGS. 9-15, sections in which a large strain occurred are shown by diagonal lines in the direction from the top right to the lower left of the figure, whereas sections in which a small strain occurred are shown by diagonal lines in the direction from the top left to the lower right of the figure. Note that the size of strain is distinguished by different colors for compressive strain and tensile strain.

FIGS. 9-14 show how the occurrence of strain was reduced in lamps A-F, with no large or small strain reaching the outer surface of the sealing part 104. By contrast, FIG. 15 shows how the area over which a small strain and a large strain occurred in lamp G was wider than in lamps A-F, with a small strain reaching the outer surface of the sealing part 104. This is because stress is applied on the entire sealing part 104 due to a large thermal expansion and contraction of the rod-shaped part 101b. In particular, the edge of the rod-shaped part 101b closer to the sealing part 104 by the light-emitting part 103 and the edge of the rod-shaped part 101b closer to the metal foil 105 contract towards the center of the rod-shaped part 101b during cooling, thus producing a strong stress and contributing to the occurrence of strain.

In the case of lamps A-F, since projections 101c are formed on the surface of the rod-shaped part 101b at the edge thereof closer to the sealing part 104 by the light-emitting part 103 and at the edge thereof closer to the metal foil 105, the contact area between the rod-shaped part 101b and the glass of the sealing part 104 is reduced, thus reducing the occurrence of strain.

Patent Literature 1 proposes a high-pressure discharge lamp in which the occurrence of cracks is reduced by providing minute gaps between the electrode and the sealing part to make the electrode and the sealing part less airtight. However, if such a minute gap extends so as to cover approximately the entire embedded section of the electrode, then when a short-arc high-pressure discharge lamp is repeatedly lit and turned off, a condensate of mercury that evaporates during lighting may enter the gap when the lamp is turned off, leading to a high likelihood of cracks occurring.

Figure 16:
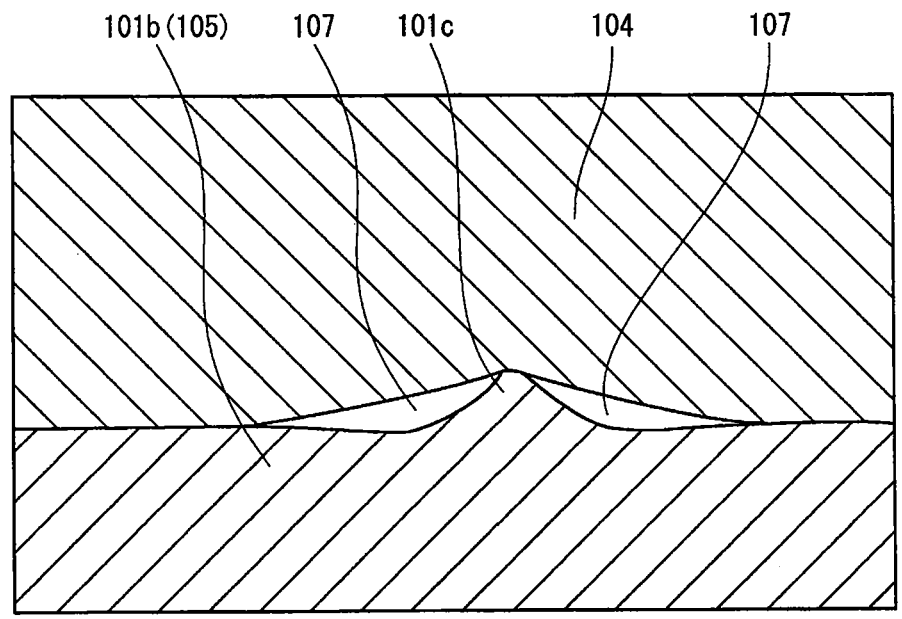
FIG. 16 is a schematic diagram illustrating the strain-reducing effect of a projection.

FIG. 16 is a schematic diagram illustrating the strain-reducing effect of a projection. By contrast, with the high-pressure discharge lamp according to Embodiment 1 of the present invention, as shown in FIG. 16, a minute gap 107 is formed at the location of the projection 101c. Due to this minute gap 107, the contact area between the rod-shaped part 101b and the sealing part 104 is reduced, thus reducing the occurrence of cracks due to strain. On the other hand, at locations where no projection 101c is formed, the rod-shaped part 101b and the sealing part 104 are in contact, and no minute gap 107 occurs. Therefore, it is difficult for a condensate of mercury to enter between the rod-shaped part 101b and the sealing part 104, thereby further reducing the occurrence of cracks.

As described below, when a projection is provided on the metal foil, a minute gap similarly forms at the location of the projection, thus reducing the contact area between the metal foil and the sealing part. Furthermore, a minute gap does not occur where no projection is formed, thus making it difficult for a condensate of mercury to enter, and thereby effectively reducing the occurrence of cracks.

In the case of lamp G, when the rod-shaped part 101b and the sealing part 104 cool after sealing, a difference in tensile stress occurs at the boundary surface therebetween, since the thermal shrinkage is less for the glass in the sealing part 104 than for the rod-shaped part 101b due to a difference between the size of the coefficients of thermal expansion of the rod-shaped part 101b and the glass in the sealing part 104. Since the contact area between the rod-shaped part 101b and the sealing part 104 is large, cracks occur as a result.

Therefore, by forming at least one projection 101c on the surface of the rod-shaped part 101b at the edge thereof closer to the sealing part 104 by the light-emitting part 103, or at the edge thereof closer to the metal foil 105, strain on the sealing part 104 is reduced, thus reducing the occurrence of cracks.

Furthermore, in lamps C-F, it is clear that strain is further reduced over lamps A and B. This is because projections 101c are formed where strain easily occurs, i.e. on the surface of the rod-shaped part 101b both at the edge thereof closer to the sealing part 104 by the light-emitting part 103 and at the edge thereof closer to the metal foil 105, thus further dispersing stress and reducing the occurrence of strain as compared to lamps A and B.

Furthermore, in lamps D-F, it is clear that strain is further reduced over lamp C. This is because projections 101c are also formed between the edge closer to the sealing part 104 by the light-emitting part 103 and at the location of connection of the rod-shaped part 101b with the metal foil 105, thus further dispersing stress and reducing the occurrence of strain.

Furthermore, lamps E and F further reduce the occurrence of strain over lamp D. This is because many projections 101c are formed across the surface of the rod-shaped part 101b. In other words, projections 101c are interspersed, thus further dispersing stress and reducing the occurrence of strain.

Note that the projections 101c in lamp F can easily be formed by rotating the rod-shaped part 101b with the central axis X of the electrode as the axis of rotation and irradiating the surface of the rod-shaped part 101b with a laser while moving the rod-shaped part 101b in the direction of the central axis of the electrode (the direction of length of the electrode) in order to continually form projections 101c.

As described above, the high-pressure discharge lamp 100 according to Embodiment 1 of the present invention reduces the occurrence of strain on the sealing part 104 and reduces the occurrence of cracks.

Note that it is preferable for the projection 101c to be higher than a maximum height $R_{max}$ of surface roughness along the surface of the rod-shaped part 101b of the electrode 101 at locations other than the projection 101c. With such a structure, the projection 101c takes precedence over locations along the surface of the rod-shaped part 101b other than the projection 101c in coming into contact with the glass of the sealing part 104, thereby further reducing the occurrence of strain.

Note that the height of the projection 101c refers to the height of the approximately vertical projection from the surface of the rod-shaped part 101b with respect to the central axis X of the electrode. The height can be measured using an electron microscope, for example. In the case of a typical electrode, the maximum height $R_{max}$ of the surface of the rod-shaped part is approximately 1 μm.

Furthermore, it is preferable that the height of the projection 101c be in a range from 10 μm or greater to 100 μm or less. When the projection 101c is 10 μm or greater, the projection 101c takes further precedence over locations along the surface of the rod-shaped part 101b other than the projection 101c in coming into contact with the glass of the sealing part 104, thereby further reducing the occurrence of strain. When exceeding 100 μm, the contact area between the projection 101c and the sealing part 104 increases, and stress cannot be completely dispersed. Note that a range from 10 μm or greater to 70 μm or less is more preferable.

It is also preferable for the crystalline structure of the projection 101c to differ from that of locations other than the projection 101c along the surface of the rod-shaped part 101b. In this case, the projection 101c can easily be formed by irradiating the surface of the rod-shaped part 101b with a laser. An example of preferable laser irradiation conditions for forming the projection 101c are to irradiate the surface of the rod-shaped part with the laser spot diameter on the surface of the rod-shaped part being approximately 10 μm-100 μm, and the irradiation being a single pulse or a continuous pulse of approximately 0.1 msec to 1 msec in duration.

Figure 17:
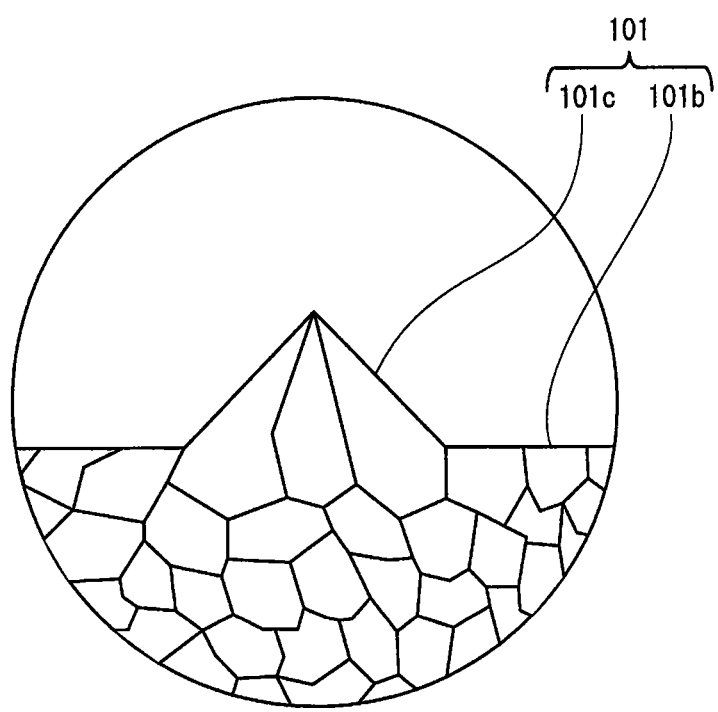
FIG. 17 is a conceptual diagram showing crystalline structure at and around a projection.

FIG. 17 is a conceptual diagram showing crystalline structure at and around the projection 101c. As shown in FIG. 17, the crystalline structure at locations other than the projection 101c along the surface of the rod-shaped part 101b is tortoise-shell like, composed of polygons, whereas the crystalline structure of the projection 101c appears pulled in a direction approximately perpendicular to the central axis X of the electrode. This is because crystal grains were pulled towards the tip of the projection 101c by laser irradiation of the surface of the rod-shaped part.

Furthermore, it is preferable that the projection 101c be approximately conical in shape. In this case, stress focuses easily on the tip of the projection 101c, improving the effect of dispersing stress on the sealing part 104 and further reducing the occurrence of strain.

Figure 18A:
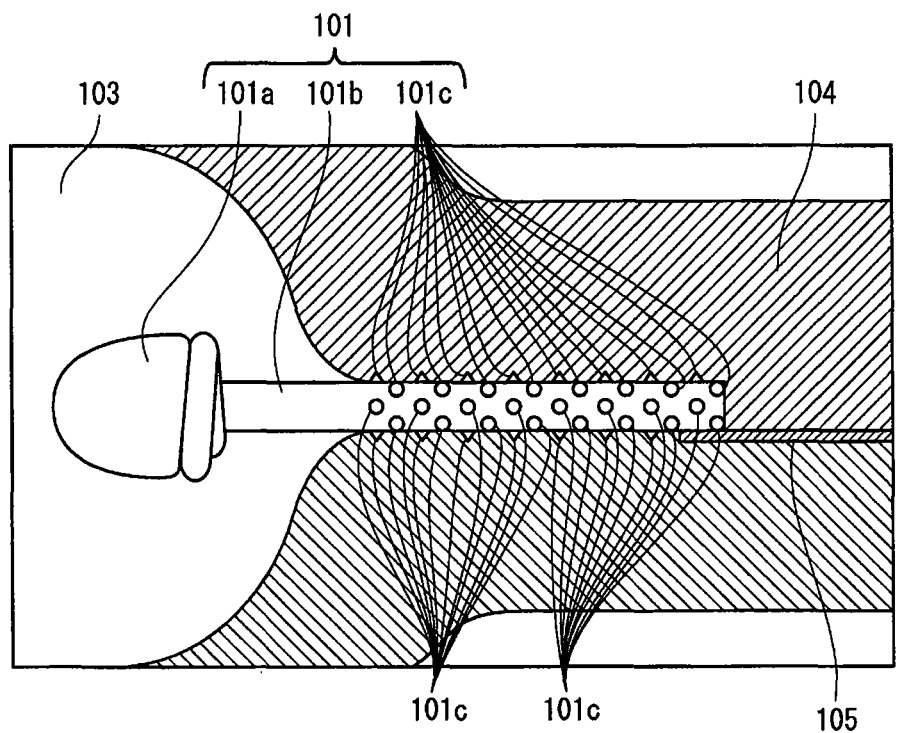
FIG. 18A is an enlarged cross-section diagram of the principal parts of modification 5 of the high-pressure discharge lamp according to Embodiment 1 of the present invention, including a central axis thereof in the direction of length.

As shown in FIG. 18A, it is also preferable that the projections 101c be staggered along the surface of the rod-shaped part 101b. In this case, it is easy to form the projections 101c at approximately equal intervals, thus making it easier to disperse stress and further reducing the occurrence of strain.

Figure 18B:
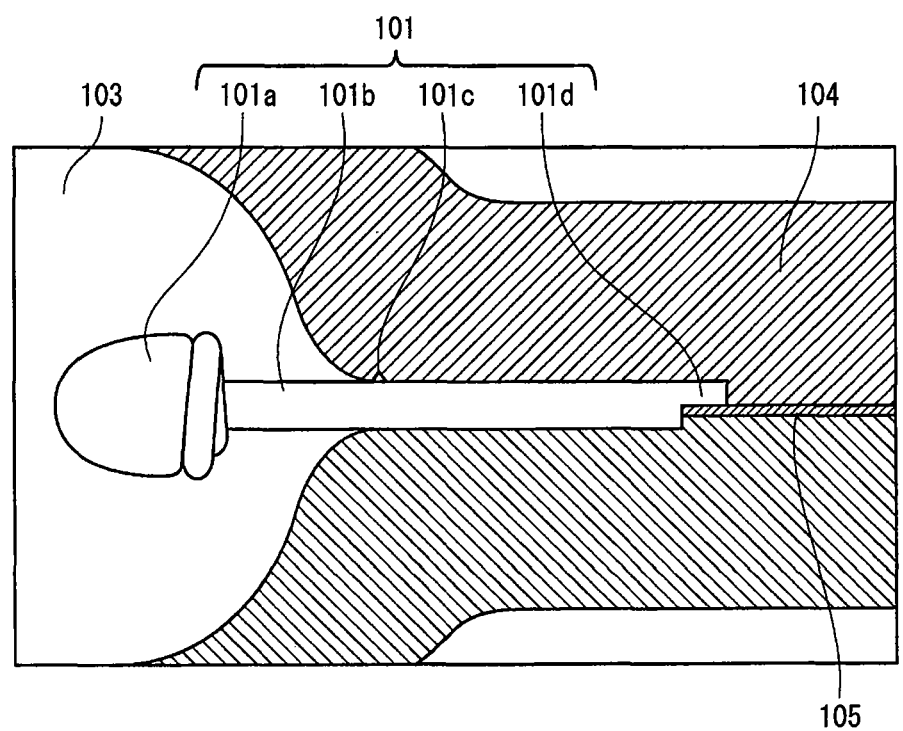
FIG. 18B is an enlarged cross-section diagram of the principal parts of modification 6 of the high-pressure discharge lamp, including a central axis thereof in the direction of length.

Furthermore, as shown in FIG. 18B, it is preferable that a cutout portion be formed at the section where the rod-shaped part 101b and the metal foil 105 are connected. In this case, the contact area between the rod-shaped part 101b and the metal foil 105 is increased as compared to when no cutout portion is formed in the rod-shaped part 101b, and when connecting the rod-shaped part 101b and the metal foil 105 via a laser or by resistance welding, the strength of the connection is improved.

Note that for the sake of convenience, the electrode 101 in FIG. 18A and FIG. 18B is shown without being cut away as a cross-section.

Furthermore, it is preferable for the projection 101c to be formed along the surface of the rod-shaped part 101b at the location of connection with the metal foil 105 (i.e. at the location of contact). In this case, when connecting the rod-shaped part 101b and the metal foil 105 by resistance welding, the resistance of the location of connection is increased, thus improving the weld strength.

Method of Manufacturing High-Pressure Discharge Lamp

The following describes a method of manufacturing the high-pressure discharge lamp 100. The method of manufacturing the high-pressure discharge lamp 100 includes the following steps.

(a) preparing a quartz glass container having a light-emitting part that forms a discharge space and a cylindrical narrow tube extending from each end of the light-emitting part, (b) forming a projection in an electrode that has a main body and a rod-shaped part connected to the main body, the projection being formed on the surface of the rod-shaped part, (c) connecting at least a part of a circumferential surface of an edge of the rod-shaped part opposite the main body to an edge of a metal foil, (d) inserting the rod-shaped part into the narrow tube so that the main body protrudes into the light-emitting part, and (e) sealing the rod-shaped part and the metal foil by fusing and then pressure welding the narrow tube.

First, in step (a), the quartz glass container (not shown in the figures) including the light-emitting part 103 that forms a discharge space and narrow tubes extending from the light-emitting part 103 is prepared.

Next, in step (b), the projection 101c is formed in the electrode 101 that has the main body 101a and the rod-shaped part 101b connected to the main body 101a, the projection 101c being formed on the surface of the rod-shaped part 101b. The projection 101c can be formed by, for example, irradiating the surface of the rod-shaped part 101b with a laser. Specifically, the projection 101c can be formed by irradiating the surface of the rod-shaped part 101b at an edge thereof closer to the sealing part 104 by the light-emitting part 103 or at an edge thereof closer to the metal foil 105.

Subsequently, in step (c), at least a part of a circumferential surface of the edge of the rod-shaped part 101b opposite the main body 101a is connected to an edge of the metal foil 105. The connection between the rod-shaped part 101b and the metal foil 105 can be formed by resistance welding, laser welding, or the like. Note that the order in which steps (b) and (c) are performed can be reversed.

Furthermore, in step (d), the electron 101 is inserted into the narrow tube so that the electrode 101 protrudes into the light-emitting part 103.

Then, in step (e), the narrow tube is fused to seal the rod-shaped part 101b. Sealing can be achieved by heating on a burner or heating with a laser (such as a tunable $CO_2$ laser). A burner and a laser can be used in conjunction.

The high-pressure discharge lamp 100 is completed by performing the above steps.

Embodiment 2

FIG. 19A is a front cross-section diagram including a tube axis of a high-pressure discharge lamp according to Embodiment 2 of the present invention, and FIG. 19B is a left cross-section diagram thereof. The high-pressure discharge lamp according to Embodiment 2 of the present invention (hereinafter referred to as "high-pressure discharge lamp 200") has substantially the same structure as the high-pressure discharge lamp 100, except for a cavity 201 being formed in at least one of the sealing parts 104, and an antenna 202 being provided at an external part of the cavity 201. Accordingly, the following describes the cavity 201 and the antenna 202 in detail, omitting a description of other points. Note that for the sake of convenience, the electrode 101, the metal foil 105, and the lead wire 106 in FIGS. 19A and 19B are shown without being cut away as a cross-section.

The cavity 201 is formed in at least one of the sealing parts 104. At least a noble gas is enclosed in the interior of the cavity 201. Similar gases (for example, a noble gas and mercury) as those in the light-emitting part 103 can be enclosed in the cavity 201. Furthermore, barium oxide, thoriated tungsten, or the like can be disposed in the cavity 201. In this case, since barium oxide and thoriated tungsten readily release electrons, discharge can easily be caused between the metal foil 105 and the antenna 202.

The antenna 202 is provided along an outer periphery of the sealing part 104 where the cavity 201 is located. The antenna 202 is, for example, a chromium-iron alloy, with one end wound three times around the outer periphery of the sealing part, and the other end connected to the external lead wire 106. Note that the antenna 202 is not limited to a chromium-iron alloy and may, for example, be a metal wire made from molybdenum, tungsten, or the like.

Note that a second antenna (not shown in the figures) acting as a so-called trigger wire can be provided at the end by the sealing part 104 and the light-emitting part 103 (roughly around the outer periphery of the sealing part 104 where the electron 101 is embedded).

As described above, the high-pressure discharge lamp 200 according to Embodiment 2 of the present invention reduces the occurrence of strain on the sealing part 104 and reduces the occurrence of cracks.

Embodiment 3

Figure 20:
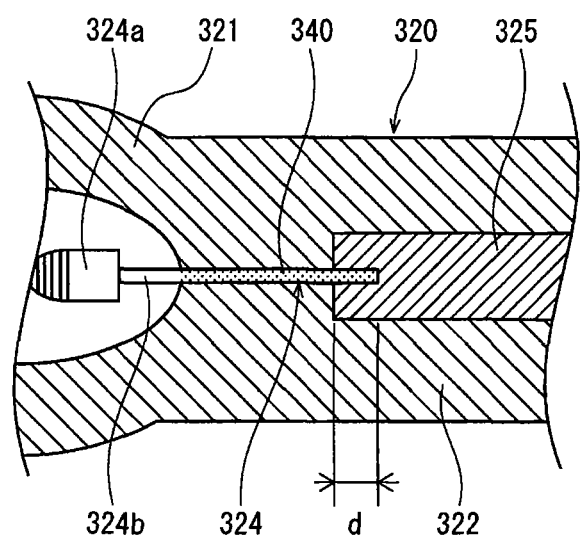
FIG. 20 is a cross-section diagram showing the structure of a high-pressure discharge lamp according to Embodiment 3 of the present invention.

As shown in FIG. 20, in a high-pressure discharge lamp 320, high melting-point metallic particles 340 are interspersed as projections along a surface region of a rod-shaped part 324b including the section where the rod-shaped part 324b and a metal foil 325 are connected. These metallic particles 340 are mixed in advance in an acidic solution which is then coated on the surface of the rod-shaped part and dried. While omitted from FIG. 20, the other half of the high-pressure discharge lamp 320 has the same structure.

The high melting-point metallic particles in Embodiment 3 of the present invention have a melting point of 2000° C. or higher. Among high melting-point metallic particles, metallic particles including one or more selected from the group of molybdenum (Mo), tungsten (W), and rhenium (Re) are preferable. Note that these metallic particles are easily acquirable commercially with 3N purity (99.9%) or higher.

High melting-point metallic particles that are pretreated in an acidic solution are used. In this context, treatment in an acidic solution of high melting-point metallic particles refers to performing interface modification of the metallic particles with the acidic solution. This treatment is not particularly limited and includes creating a mixture of the acidic solution and the metallic particles and coating or spraying the acidic solution on the surface of the metallic particles.

The acidic solution serves to dissolve the surface of the high melting-point metallic particles or to aggregate the metallic particles. As the acidic solution, any solution that is a strong proton donor but a weak receptor can be used without any particular problem. It is preferable, however, for the acidic solution to include one or more selected from the group of aqueous hydrogen peroxide, hydrofluoric acid, nitric acid, and aqua regia. This is because these acidic solutions have a strong effect of dissolving molybdenum (Mo), tungsten (W), and rhenium (Re). Note that the acidic solution can be one of the above solutions in isolation or a mixture thereof.

Conventionally, when the metal component and the sealing part cool after sealing, a difference in tensile stress occurs at the boundary surface therebetween, since the thermal shrinkage is greater for the sealing part than for the metal component due to a difference between the size of the coefficients of thermal expansion of the metal component and the sealing part. As a result, cracks occur. Embodiment 3 of the present invention addresses this issue by including the above high melting-point metallic particles that have been treated in an acidic solution along the boundary surface between the metal component and the sealing part. This has a first result of reducing the size of the contact area between the metal component and the glass of the sealing part, thus reducing the occurrence of strain. A second result is a reduction in the occurrence of cracks, since the metallic particles act as a buffer material compensating for the difference between the coefficients of thermal expansion of the metal component and the sealing part, thereby greatly relieving stress produced by the difference in thermal shrinkage between the metal component and the sealing part.

Furthermore, since the metallic particles do not form a strong chemical bond with the surface of the metal component, the metallic particles also function as a lubricant that freely moves along the boundary surface between the metal component and the sealing part. As a result, the occurrence of cracks is reduced, since the tensile stress at the boundary surface is lessened during cooling after sealing.

From the perspective of reducing the occurrence of cracks, it is preferable that the average diameter of the metallic particles before treatment with the acidic solution be in a range of 1 μm-100 μm. By treating such metallic particles with the acidic solution, it is easy to form aggregates of an appropriate size for a buffer material or a lubricant, specifically in an approximate range of 2 μm-50 μm. Such a size is useful for lessening tensile stress at the boundary surface between the metal component and the sealing part.

Furthermore, as the solution for treating the high melting-point metallic particles, use of a highly acidic solution such as hydrofluoric acid or aqua regia requires neutralization before coating of the rod-shaped part and the like, thus presenting new problems such as an increase in the number of manufacturing steps. Therefore, it is preferable to use aqueous hydrogen peroxide as the solution, since such a solution requires no neutralization and does not corrode the rod-shaped part and the like, and also volatilizes, leaving behind no residue.

Examples of specific values for the high-pressure discharge lamp in Embodiment 3 are as follows.

Figure 21A:
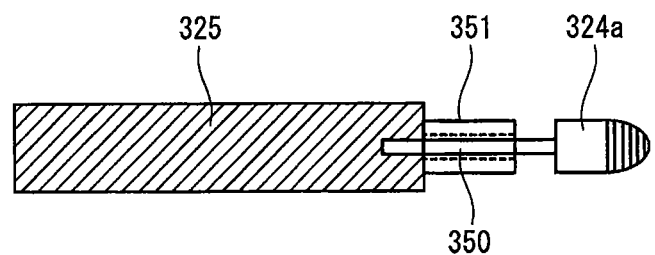
FIG. 21A is a cross-section diagram showing the structure of an electrode in the high-pressure discharge lamp according to Embodiment 3 of the present invention.

Inner diameter φai of the light-emitting part at a central region thereof: 5 mm
  Outer diameter φao: 12 mm
  Internal volume of light-emitting part: 0.1 cm$^3$
  Inter-electrode distance Ld: 1.2 mm
  Amount of enclosed mercury: 0.35 mg/mm$^3$
  Amount of enclosed argon gas: 30 kPa (25° C.)
  Amount of enclosed bromine: 0.5×10$^{-3}$ μmol Furthermore, as shown in FIG. 21A, from the perspective of reducing the occurrence of cracks in the high-pressure discharge lamp, a quartz glass sleeve (thin tube) 351, having the high melting-point metallic particles 350 coated on an inner wall thereof, can be incorporated into the rod-shaped part 324b. Note that the sleeve 351 is fused during the sealing process to become part of the arc tube.

As described above, high melting-point metallic particles 350, such as tungsten, molybdenum, or rhenium, that have been treated with an acidic solution are coated in advance on the inner wall of the sleeve 351 used in the present embodiment. By fitting such a sleeve on the rod-shaped part 324b, metallic particles of a variety of sizes are interspersed between the sleeve 351 and the rod-shaped part 324b in the same way as when high melting-point metallic particles 340 are coated on the surface of the rod-shaped part 324b. Since a large number of metallic particles that act as a buffer material and a lubricant are thus located between the sleeve and the rod-shaped part, tensile stress at the boundary surface between the rod-shaped part and the sealing part is thus lessened. As a result, the occurrence of cracks in the high-pressure discharge lamp is more effectively reduced. Furthermore, in the present structure with a sleeve, the sleeve 351 prevents the metallic particles from peeling or falling off the surface of the rod-shaped part. Therefore, as compared to when the high melting-point metallic particles are coated directly on the surface of the rod-shaped part, the likelihood of the metallic particles peeling off the rod-shaped part is reduced, thus resulting in an even greater reduction in the occurrence of cracks.

Figure 21B:
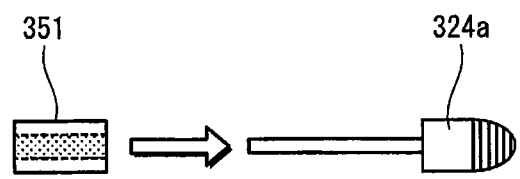
FIGS. 21B and 21C illustrate the method of forming the electrode shown in FIG. 21A.
Figure 21C:
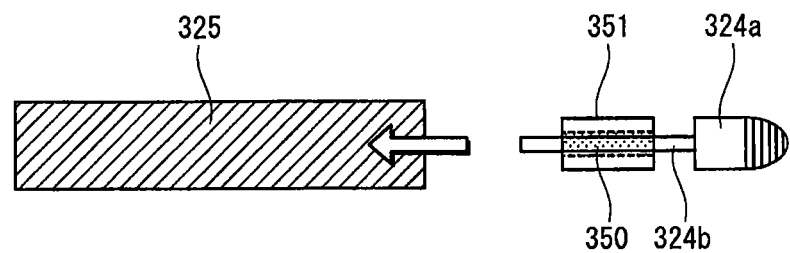

The following describes a method for preparing a high-pressure discharge lamp having the above sleeve. As shown in FIG. 21B, first, a sleeve 351 is washed with pure water before coating with the high melting-point metallic particles 350.

Next, after thoroughly drying the washed sleeve 351, a turbid solution containing a mixture of predetermined metallic particles 350 (for example, tungsten, molybdenum, and rhenium) and an acidic solution such as aqueous hydrogen peroxide is injected into the sleeve 351, which has a tubular body. The method for injecting the turbid solution into the sleeve 351 is not particularly limited. An ejector such as a dispenser can be used, for example. After injection of the turbid solution, the sleeve 351 is thoroughly dried. This results in the inner wall of the sleeve 351 being coated with the high melting-point metallic particles 350. Note that the method of drying the turbid solution after coating is not particularly limited. A constant temperature and moisture chamber can be used, or the turbid solution can be allowed to dry naturally by being left standing at room temperature. After inserting the dried sleeve 351 into the rod-shaped part 324b, an edge of the rod-shaped part 324b is connected to the metal foil 325 by welding or the like.

Method of Manufacturing High-Pressure Discharge Lamp

The method of manufacturing the high-pressure discharge lamp 300 includes the following steps.

(a) preparing a quartz glass container having a light-emitting part that forms a discharge space and a cylindrical narrow tube extending from each end of the light-emitting part, (b) preparing electrodes provided with a main body and a rod-shaped part having high melting-point metallic particles interspersed on a surface thereof, the metallic particles having been treated with an acidic solution, (c) inserting the rod-shaped parts into the narrow tubes so that the main bodies protrude into the light-emitting part, and (d) sealing the rod-shaped parts by fusing and then pressure welding the narrow tubes.

First, in step (a), a quartz glass container including a light-emitting part that forms a discharge space and narrow tubes extending from the light-emitting part is prepared. The container refers to the precursor of the arc tube before the sealing parts are formed to hermetically seal the light-emitting part.

Next, in step (b), electrodes provided with a main body and a rod-shaped part having high melting-point metallic particles interspersed thereon are prepared, the metallic particles having been treated with an acidic solution. The method of interspersing the metallic particles on the surface of the rod-shaped parts is not particularly limited. For example, a turbid solution containing a mixture of predetermined metallic particles and an acidic solution can be coated on the surface of the rod-shaped parts, or the rod-shaped parts can be soaked in such a turbid solution. Alternatively, the metallic particles can be sprayed or vapor deposited. If metallic particles treated in an acidic solution such as aqueous hydrogen peroxide are coated on the surface of a metal components such as the rod-shaped parts, the metallic particles can be interspersed along the surface of the rod-shaped parts while the surface is being dissolved. Note that the effect of reducing the occurrence of cracks is achieved not only by interspersing the metallic particles treated with a predetermined acidic solution on the surface of the rod-shaped parts, but also on the surface of other metal components, such as the metal foil, that can come into contact with the quartz glass.

Incidentally, as described above, while the method of treating the metallic particles with the acidic solution is not particularly limited, care must be taken during treatment, since interface modification of the metallic particles changes depending on the type (acidity) of acidic solution and the duration and degree to which the acidic solution and the metallic particles are in contact. However, when treating the metallic particles with aqueous hydrogen peroxide, for example, there is little risk of a difference in interface modification that would affect coating even if the metallic particles are left mixed in aqueous hydrogen peroxide for a day or a week, since aqueous hydrogen peroxide has extremely weak acidity as compared to strongly acidic aqua regia or the like.

The rod-shaped parts are dried after coating with the high melting-point metallic particles that are treated with an acidic solution. At this point, it is preferable to thoroughly evaporate the solution component with which the metallic particles are treated. This is because any remaining solution component may affect the properties of the high-pressure discharge lamp. Note that examples of a method for drying the rod-shaped part include natural drying or drying with a well-known dryer.

Furthermore, in step (c), the rod-shaped parts having the high melting-point metallic particles interspersed thereon are inserted into the narrow tubes so that the electrodes protrude into the light-emitting part. Then, in step (d), the narrow tubes are fused to seal the rod-shaped part.

Experiments

Next, an experiment to confirm the advantageous effects of the high-pressure discharge lamp according to Embodiment 3 of the present invention is described.

In the present experiment, tungsten (W), rhenium (Re), and molybdenum (Mo) were used as the high melting-point metallic particles, and aqueous hydrogen peroxide (3 wt % $H_2O_2$), which dissolves each of these metallic particles, was used. The metallic particles all had an average diameter of 1 μm-2 μm and 4N-5N purity.

Next, in order to determine the state in which the metallic particles were interspersed along the rod-shaped part, both metallic particles that were and were not treated with the acidic solution were coated on the surface of the rod-shaped part, and after drying, the surface conditions were observed visually and with an SEM. The following two samples were created for the experiment.

Sample A: rod-shaped part coated with untreated metallic particles

Sample B: rod-shaped part coated with metallic particles treated in aqueous hydrogen peroxide For sample B, a turbid solution prepared by mixing the metallic particles with aqueous hydrogen peroxide was coated on the surface of the rod-shaped part, and the rod-shaped part was then naturally dried.

Upon visually examining the surface of samples A and B, only a few metallic particles were present on the surface of the rod-shaped part in sample A. In sample B, on the other hand, metallic particles were confirmed to be evenly coated on the surface of the rod-shaped part.

Next, the surface of each rod-shaped part was observed with an SEM, revealing the presence of metallic particles with an approximately spherical shape on the surface of the rod-shaped part in sample A.

On the other hand, it was confirmed that the surface of the rod-shaped part in sample B was not level, and that metallic particles had assumed a variety of shapes, with a portion of the metallic particles forming aggregates or being enlarged. Furthermore, in sample B, it was also observed that metallic particles both large and small, including metallic particles with no change in shape and aggregates of metallic particles, were attached to the surface of the rod-shaped part as if forming a stone wall. In sample B, it was also confirmed that metallic particles, treated with the acidic solution, that accumulated on the surface of the rod-shaped part were approximately 1 μm-100 μm in size, and furthermore, that the accumulation was attached strongly enough so as not to peel off even if the rod-shaped part was shaken to some degree.

At the same time, it was confirmed that when metallic particles treated in the acidic solution were coated on the part of the metal foil welded with the rod-shaped part as well, the metallic particles were attached strongly enough to the surface of the metal foil so as not to peel off even if the rod-shaped part was shaken to some degree.

Also when using hydrofluoric acid, nitric acid, a mixture of hydrofluoric acid and nitric acid, or aqua regia as the acidic solution, it was confirmed that tungsten, rhenium, and molybdenum were dissolved, and that as a result of coating, as above, the surface of the rod-shaped part with the high melting-point metallic particles treated with these acidic solutions, the high melting-point metallic particles formed aggregates and were evenly interspersed on the surface of the rod-shaped part, as when using aqueous hydrogen peroxide.

Next, the following experiment was performed to confirm the advantageous effect of Embodiment 3 of reducing the occurrence of cracks. First, after coating a predetermined position of the rod-shaped part with metallic particles treated with an appropriate acidic solution, 100 dried high-pressure discharge lamps were prepared, and the occurrence of cracks (initial cracks) in the high-pressure discharge lamps after sealing was visually observed. Tables 22 and 23 show the results of the experiment. As is clear from tables 22 and 23, in the high-pressure discharge lamps in which metallic particles treated in the acidic solution were interspersed along the boundary surface between the metal component and the sealing part, the occurrence of cracks was dramatically reduced.

Metallic particles achieve this advantageous effect when formed on any part of the rod-shaped part or the metal foil. As shown in tables 22 and 23, however, the occurrence of cracks is dramatically reduced in particular when the metallic particles are formed on the surface of the rod-shaped part, the part of the rod-shaped part and the metal foil that is welded, or on the back of the metal foil. The advantageous effect of reducing the occurrence of cracks was not limited to when at least one metallic particle was attached to the rod-shaped part, but was also achieved when at least one metallic particle was attached to the metal foil. Furthermore, this advantageous effect was not limited to when metallic particles were attached, but was also achieved when projections were formed on the metal foil by laser irradiation or the like.

Note that when attaching metallic particles to the surface of the rod-shaped part, it is more effective to attach the metallic particles to the circumferential surface of the rod-shaped part than at the edges thereof. Furthermore, with regards to the part of the rod-shaped part and the metal foil that is welded, it is more effective to attach metallic particles to the area, indicated by the letter "d" in FIG. 20, of the main surface of the metal foil by the part welded to the rod-shaped part (i.e. the area from the edge of the metal foil closer to the electrode to the edge of the rod-shaped part closer to the metal foil). As for the back of the metal foil, it is more effective to attach metal particles to the area, indicated by the letter "d" in FIG. 20, of the main surface opposite the main surface of the metal foil by the part welded to the rod-shaped part.

Next, using a lamp unit incorporating the high-pressure mercury lamp of Embodiment 3, an experiment on the lifetime of the high-pressure discharge lamp was performed, and the conditions of damage to the sealing parts in the arc tube were observed. The experiment on the lifetime of the high-pressure discharge lamp was a lighting cycle experiment performed on 30 high-pressure discharge lamps by repeating, for a predetermined period of time, a cycle consisting of lighting each lamp for one hour and then turning each lamp off for 0.5 hours. The lamps were stably lit with a rated power of 300 W and a square-wave current at a wavelength of 100 Hz.

As a result, as is clear from FIGS. 22 and 23, no damage to the sealing parts was observed for a cumulative lighting duration from the start of lighting until the time of observation of 100 h, 250 h, 500 h, 750 h, 1000 h, 1500 h, and 2000 h. It was thus confirmed that the high-pressure discharge lamp according to the present embodiment achieves the advantageous effect of greatly reducing the occurrence of cracks along the boundary surface between the metal component, such as the rod-shaped part, and the sealing parts even when cumulative lighting exceeds a lengthy duration of 2000 h.

Next, the inventors performed an experiment to observe whether cracks occurred in a high-pressure discharge lamp including a sleeve, an inner wall of the sleeve having been coated with metallic particles treated in an acidic solution. FIG. 21A shows a schematic representation of an arc tube prepared for the present experiment.

In the high-pressure discharge lamp prepared for the present experiment, a quartz glass sleeve 51 having high melting-point metallic particles coated on an inner wall thereof was fit on the rod-shaped part. The rod-shaped part was formed from tungsten or the like, and a cross-section thereof was an approximate cylinder with an approximately circular shape. The rod-shaped part had a diameter of 0.5 mm and a length of 8.0 mm. Note that apart from fitting the sleeve on the rod-shaped part, this structure was the same as the specifications of the arc tube in the high-pressure discharge lamp described above, and therefore a description of the structure is omitted.

The sleeve was a quartz glass tubular body having an outer diameter of 1.8 mm, an inner diameter of 0.6 mm, and a length of 2.5 mm. An inner wall of the sleeve was coated with high melting-point metallic particles treated with an acidic solution. In the present experiment, 3 wt % of aqueous hydrogen peroxide was used as the acidic solution, and a combination of tungsten, molybdenum, and rhenium was used as the high melting-point metallic particles. The reason for using aqueous hydrogen peroxide was that aqueous hydrogen peroxide has the effect of dissolving high melting-point metallic particles even though it is not strongly acidic, and furthermore, since aqueous hydrogen peroxide evaporates when dried, none remains on the coated surface.

The arc tube for the present experiment was created under the following conditions.

Central inner diameter of light-emitting part: 5 mm
Central outer diameter of light-emitting part: 12 mm
Volume of light-emitting part: 0.1 cc
Amount of enclosed mercury: 0.35 mg/mm$^3$
Amount of enclosed argon gas: 30 kPa (25° C.)
Amount of enclosed bromine: 0.5×10$^{-3}$ μmol
Inter-electrode distance: 1.2 mm
Sealing part: sealed by known shrink-seal method Upon visual examination of the sealing parts having sealed therein the rod-shaped parts with the sleeve fitted thereon, it was confirmed that the occurrence of initial cracks was reduced, as compared to a conventional structure, near the boundary surface between the rod-shaped part and the sealing part, in particular near the surface of the rod-shaped part. This was considered to be because stress on the quartz glass near the boundary surface caused by thermal expansion of the rod-shaped part during the sealing process was reduced as a result of a smaller contact area between the rod-shaped part and the sealing part due to the presence of the high melting-point metallic particles.

Using a lamp unit incorporating the high-pressure discharge lamp along with a reflector, an experiment on the lifetime of the high-pressure discharge lamp was performed, and the conditions of damage to the sealing parts in the arc tube were observed. As a result, no damage to the sealing parts was observed for a cumulative lighting duration from the start of lighting until the time of observation of 100 h, 250 h, 500 h, 750 h, 1000 h, 1500 h, and 2000 h. It was thus confirmed that the high-pressure discharge lamp according to the present embodiment achieves the advantageous effect of greatly reducing the occurrence of cracks even when cumulative lighting exceeds a lengthy duration of 2000 h. As is clear from these results, fitting a sleeve, the inner wall of which is coated with metallic particles treated in a predetermined acidic solution, on the rod-shaped part is particularly favorable for reducing the occurrence of cracks in the boundary surface region between the rod-shaped part and the sealing part.

Embodiment 4

Figure 24:
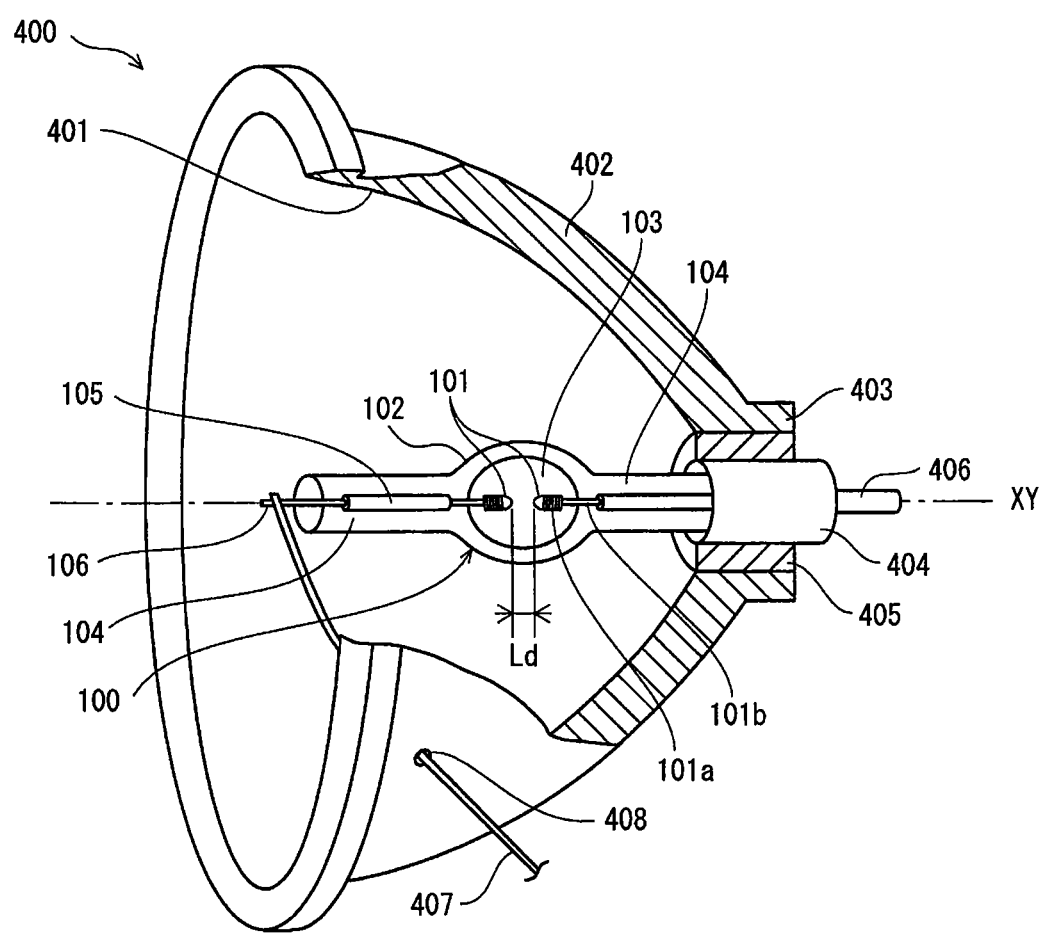
FIG. 24 is a partially cutaway perspective view of a lamp unit according to Embodiment 4 of the present invention.

FIG. 24 is a partially cutaway perspective view of a lamp unit according to Embodiment 4 of the present invention. The lamp unit according to Embodiment 4 of the present invention (hereinafter, lamp unit 400) is provided with the high-pressure discharge lamp 100 according to Embodiment 1 of the present invention.

As shown in FIG. 24, the lamp unit 400 is provided with a high-pressure discharge lamp 100 and a reflector 402 having a concave reflecting surface 401. The high-pressure discharge lamp 100 is attached to the inside of the reflector 402 so that light emitted from the high-pressure discharge lamp 100 is reflected by the reflecting surface 401.

The concave reflecting surface 401 is formed on the inner surface of the reflector 402, and the reflecting surface 401 reflects light emitted by the high-pressure discharge lamp 100. In order to increase the collection efficiency of the reflector 402 with respect to the high-pressure discharge lamp 100, the reflector 402 is combined with the high-pressure discharge lamp 100 so that the central axis of the high-pressure discharge lamp 100 in the direction of length thereof (which matches the central axis X of the electrode) is approximately aligned with the light axis Y of the reflector 402. Note that a typical structure for the reflecting surface 401 is for example an ellipsoid of revolution or a paraboloid of revolution having a multilayer interference film or the like vapor deposited thereon, but the structure of the reflecting surface 401 is not particularly limited in the present invention. The sealing part 104 is inserted into a base 404 at a neck 403 of the reflector 402 and is thus fixed with respect to the reflector 402. The base 404 is, for example, a cylindrical shape and is fixed with respect to the reflector 402 by adhesive 405 or the like. An electrode connection terminal 406 is provided in the base 404.

Within the high-pressure discharge lamp 100, a lead wire 106 is connected to a power supply line 407 at the opposite end as the base 404. The power supply line 407 passes through a through-hole 408 provided in the reflector 402.

Note that the high-pressure discharge lamp 100 is used in FIG. 24, but the high-pressure discharge lamp 200 or 320 may also be used.

With the structure of the lamp unit 400 according to Embodiment 4 of the present disclosure as described above, reliability is improved by providing the high-pressure discharge lamp 100, 200, or 320 that reduces the occurrence of cracks and strain in the sealing part.

Embodiment 5

Figure 25:
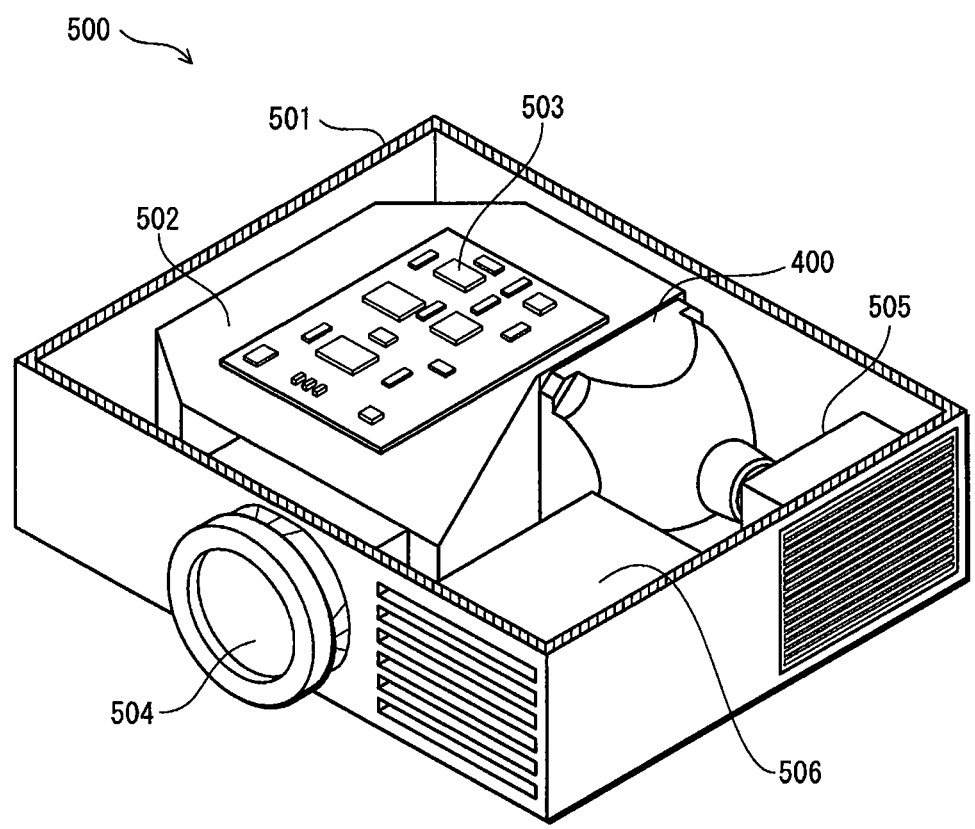
FIG. 25 is a perspective view of a projection image display device according to Embodiment 5 of the present invention.

FIG. 25 is a perspective view of a projection image display device according to Embodiment 5 of the present invention. The projection image display device according to Embodiment 5 of the present invention (hereinafter "image display device 500") is a projector that projects an image towards a screen (not shown in the figures) positioned in front of the projector.

The projection image display device 500 is provided with a lamp unit 400, an optical unit 502 that converts illumination from the lamp unit and forms an optical image, and a projection device 504 that enlarges and, projects the optical image.

Specifically, the projection image display device 500 is provided with a case 501, the lamp unit 400 stored within the case, an optical unit 502, a control unit 503, the projection device 504, a cooling fan unit 505, and a power unit 506.

The power unit 506 includes a DC power supply circuit and a high-pressure discharge lamp lighting device (neither of which is shown in the figures). The power unit 506 converts power supplied from a commercial power source into power appropriate for the control unit 503, the lamp unit 400, and the cooling fan unit 505 and provides the converted power thereto. Note that in FIG. 25, in order to clearly show the structure of the projection image display device 500, the case 501 is shown with a top plate thereof removed.

With the structure of the projection image display device 500 according to Embodiment 5 of the present disclosure as described above, reliability is improved by providing the high-pressure discharge lamp 100, 200, or 320 that reduces the occurrence of cracks and strain in the sealing part.

Embodiment 6

Figure 26:
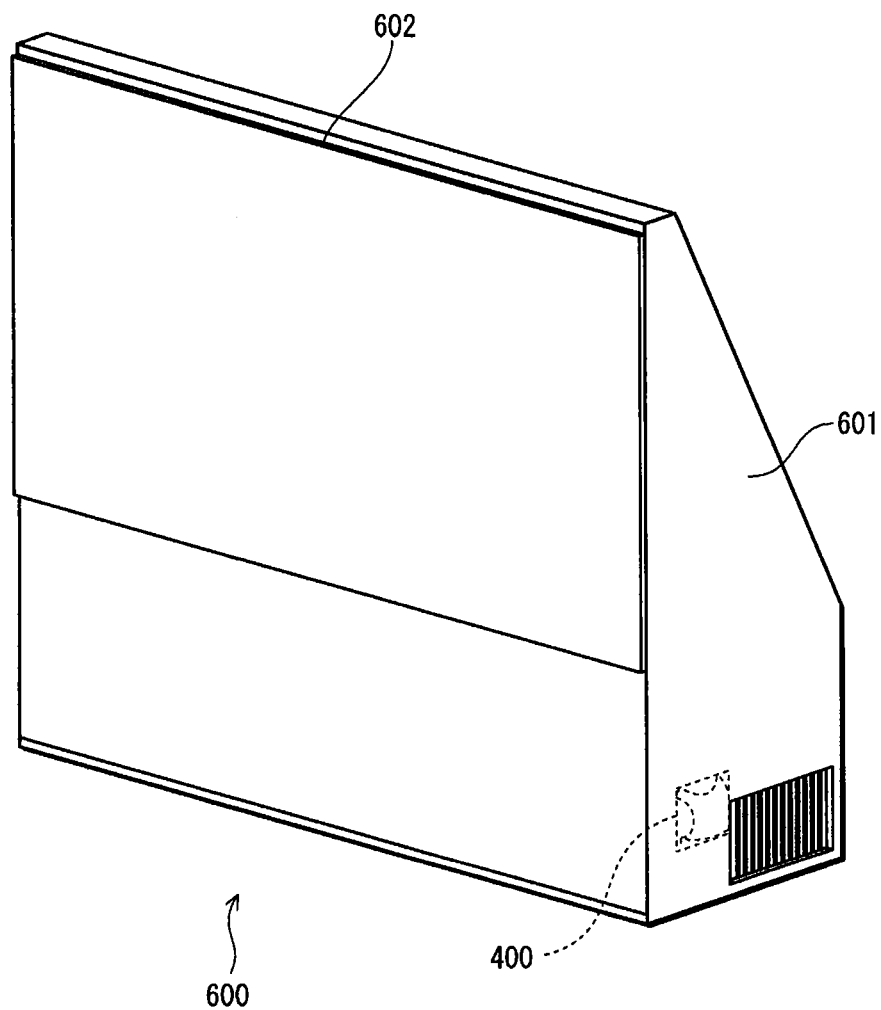
FIG. 26 is a perspective view of a projection image display device according to Embodiment 6 of the present invention.

FIG. 26 is a perspective view of a projection image display device according to Embodiment 6 of the present invention. The projection image display device according to Embodiment 6 of the present invention (hereinafter "image display device 600") is a rear projector that includes a lamp unit 400 and a case 601. The lamp unit 400 incorporates a high-pressure discharge lamp. A projection device, mirror (neither of which is shown in the figures), and the like are stored in the case 601.

The image display device 600 displays an image projected from a projection lens (not shown in the figures) and reflected by a mirror (not shown in the figures) from behind a transparent screen 602 provided at an opening of the case 601.

With the structure of the projection image display device 600 according to Embodiment 6 of the present disclosure as described above, reliability is improved by providing the high-pressure discharge lamp 100, 200, or 320 that reduces the occurrence of cracks and strain in the sealing part.

Modifications

Specific examples of the present invention as shown in the above embodiments have been described. The present invention, however, is of course not limited to the examples shown in the embodiments and can be modified as needed so long as the advantageous effects of the present invention are maintained.

In the above embodiments, a double-end high-pressure discharge lamp in which both ends are sealed has been shown, but sealing is not particularly limited. For example, the high-pressure discharge lamp can be a single-end type.

INDUSTRIAL APPLICABILITY

The present invention is widely applicable to high-pressure discharge lamps, lamp units, and projection image display devices. The high-pressure discharge lamp of the present invention prevents the occurrence of cracks in the area where the metal component and the sealing part come into contact and is therefore useful as a high-pressure mercury lamp that is the light source for a projection image display device. Furthermore, apart from high-pressure mercury lamps, the present invention is also applicable as is to high-pressure discharge lamps, such as metal halide lamps, and can be used as a metal halide lamp in an automobile headlight, for example.

REFERENCE SIGNS LIST 100, 200, 320 high-pressure discharge lamp
101, 324 electrode
101a, 324a main body
101b, 324b rod-shaped part
101c, 340 projection
102 arc tube
103, 321 light-emitting part
104, 322 sealing part
105, 325 metal foil
106 lead wire
340 metallic particle
400 lamp unit
401 reflecting surface
402 reflector
500, 600 projection image display device
502 optical unit
504 projection device

The invention claimed is:

1. A high-pressure discharge lamp comprising:
a glass arc tube including a light-emitting part and a sealing part connected to the light-emitting part, the light-emitting part enclosing a discharge space; and
a pair of electrodes, each having a rod-shaped part, one end of each of the electrodes facing one end of the other electrode in the discharge space, and at another end of each electrode, the rod-shaped part being embedded in the sealing part and connected to a metal foil to form an embedded section, wherein
in at least one embedded section of the pair of electrodes, the rod-shaped part has at a surface thereof at least one projection,
the at least one projection comprises high-melting point metallic particles having been treated in an acidic solution, and
the metallic particles are freely movable along a boundary surface between the rod-shaped part and the sealing part.

2. The high-pressure discharge lamp of claim 1, wherein the at least one projection is formed on at least one of regions at either end of the at least one embedded section of the pair of electrodes along a central electrode axis.

3. The high-pressure discharge lamp of claim 1, wherein the at least one projection comprises a plurality of interspersed projections.

4. The high-pressure discharge lamp of claim 1, wherein a height of the at least one projection is greater than a maximum height $R_{max}$ of surface roughness of the at least one embedded section of the pair of electrodes in locations other than the at least one projection.

5. The high-pressure discharge lamp of claim 1, wherein the high melting-point metallic particles are metallic particles of one or more selected from the group consisting of molybdenum, tungsten, and rhenium.

6. The high-pressure discharge lamp of claim 1, wherein the acidic solution includes one or more selected from the group consisting of aqueous hydrogen peroxide, hydrofluoric acid, nitric acid, and aqua regia.

7. The high-pressure discharge lamp of claim 1, wherein a thin glass tube is fit on each of the embedded sections of the electrodes, an inner wall of each thin glass tube being coated with the high melting-point metallic particles.

8. A lamp unit comprising:
the high-pressure discharge lamp of claim 1; and
a reflector having a concave reflecting surface, the high-pressure discharge lamp being attached to an inside of the reflector so that light emitted from the high-pressure discharge lamp is reflected by the reflecting surface.

9. A projection image display device comprising:
the lamp unit of claim 8;
an optical unit that converts illumination from the lamp unit and forms an optical image; and
a projection device that enlarges and projects the optical image.

10. A high-pressure discharge lamp comprising:
a glass arc tube including a light-emitting part and a sealing part connected to the light-emitting part, the light-emitting part enclosing a discharge space;
a pair of electrodes, one end of each of the electrodes facing one end of the other electrode in the discharge space; and
a metal foil embedded in the sealing part with the other end of each electrode connected thereto, wherein
the metal foil includes at least one projection, and
the at least one projection comprises metallic particles that are freely movable along a boundary surface between the metal foil and the sealing part.

* * * * *